US012708882B2

(12) United States Patent
Brough et al.

(10) Patent No.: US 12,708,882 B2
(45) Date of Patent: Aug. 18, 2026

(54) MULTI-PURPOSE VALVE FOR A BEVERAGE SYSTEM

(71) Applicant: SharkNinja Operating LLC, Needham, MA (US)

(72) Inventors: Michael Brough, Brookline, MA (US); Hamish Thompson, London (GB); Jack Richardson, Yorkshire (GB)

(73) Assignee: SharkNinja Operating LLC, Needham, MA (US)

( * ) Notice: Subject to any disclaimer, the term of this patent is extended or adjusted under 35 U.S.C. 154(b) by 336 days.

(21) Appl. No.: 18/515,894

(22) Filed: Nov. 21, 2023

(65) Prior Publication Data

US 2025/0161889 A1 May 22, 2025

(51) Int. Cl.
*B01F 23/23* (2022.01)
*B01F 23/236* (2022.01)
*B01F 35/71* (2022.01)

(52) U.S. Cl.
CPC ...... *B01F 23/2362* (2022.01); *B01F 23/2364* (2022.01); *B01F 35/71805* (2022.01)

(58) Field of Classification Search
CPC ..... B01F 23/21; B01F 23/236; B01F 23/2362
See application file for complete search history.

(56) References Cited

U.S. PATENT DOCUMENTS 4,139,123 A * 2/1979 Castillo ................ B67D 1/0054 222/129.1
8,561,842 B2 10/2013 Pizzacalla et al.
8,939,173 B2 1/2015 Yahr et al.
9,421,503 B2 8/2016 An et al.
9,453,580 B2 9/2016 Arnau et al.
10,408,363 B2 9/2019 Biwersi et al.
10,520,105 B2 12/2019 Eszterle et al.
10,781,928 B2 9/2020 Tanimura et al.
10,794,483 B2 10/2020 Sasanuma et al.
10,975,978 B2 4/2021 Tamba
11,142,445 B2 10/2021 Leone
(Continued)

FOREIGN PATENT DOCUMENTS

CN 102278516 B 1/2016
CN 111588270 A 8/2020
(Continued)

OTHER PUBLICATIONS

International Search Report and Written Opinion for PCT Patent Application No. PCT/US2024/054410 mailed Jan. 29, 2025. (13 pages).

(Continued)

*Primary Examiner* — Robert A Hopkins
(74) *Attorney, Agent, or Firm* — Mintz, Levin, Cohn, Ferris, Glovsky and Popeo, P.C. US

(57) ABSTRACT

Various illustrative systems, devices, and methods for beverage systems are provided. In general, a beverage system is configured to form a beverage and dispense the beverage into a container, such as a bottle, a cup, or other container. The beverage system can be a carbonation system configured to form a carbonated fluid and dispense the carbonated fluid into a container. In an exemplary embodiment, the beverage system includes a multi-purpose valve configured to control the dispensing of the carbonated fluid and to control venting of gas.

19 Claims, 16 Drawing Sheets

(56) References Cited

U.S. PATENT DOCUMENTS

| | | | |
|---|---|---|---|
| 11,199,275 | B2 | 12/2021 | Narita et al. |
| 11,408,531 | B2 | 8/2022 | Narita et al. |
| 11,529,594 | B2 | 12/2022 | Sawyer et al. |
| 11,542,069 | B2 | 1/2023 | Yueh |
| 11,603,939 | B2 | 3/2023 | Stanton et al. |
| 11,612,865 | B1 | 3/2023 | Reisner-Stehman et al. |
| 11,745,996 | B1 | 9/2023 | Zbedlick |
| 11,751,585 | B1 | 9/2023 | Anthony et al. |
| 2020/0047137 | A1 | 2/2020 | Wilder et al. |
| 2022/0146001 | A1 | 5/2022 | Miyazoe et al. |
| 2022/0390024 | A1 | 12/2022 | Duff et al. |
| 2023/0140241 | A1 | 5/2023 | Tanaka et al. |
| 2023/0148788 | A1 | 5/2023 | Van Druten et al. |
| 2023/0204110 | A1 | 6/2023 | Sobka et al. |
| 2023/0255389 | A1 | 8/2023 | Moughton et al. |

FOREIGN PATENT DOCUMENTS

| | | | | |
|---|---|---|---|---|
| CN | 112283404 | A | 1/2021 | |
| CN | 107421174 | B | 4/2021 | |
| CN | 111720590 | B | 10/2021 | |
| CN | 113048263 | B | 11/2021 | |
| CN | 113653829 | A | 11/2021 | |
| CN | 113958728 | A | 1/2022 | |
| CN | 114145631 | A | 3/2022 | |
| CN | 112005032 | B | 5/2022 | |
| CN | 114704671 | A | 7/2022 | |
| CN | 115040014 | A | 9/2022 | |
| CN | 110985707 | B | 11/2022 | |
| CN | 116480810 | A | 7/2023 | |
| CN | 116538328 | A | 8/2023 | |
| EP | 2277619 | A1 * | 1/2011 | .............. C02F 1/685 |
| EP | 2311671 | B1 | 11/2014 | |
| WO | 2022171986 | A2 | 8/2022 | |

OTHER PUBLICATIONS

U.S. Appl. No. 17/821,212 entitled "Beverage Carbonation System Flow Control", filed Aug. 22, 2022, 43 pages.
U.S. Appl. No. 18/099,690 entitled "Venting A Chamber In A Beverage Carbonation System", filed Jan. 20, 2023, 84 pages.
U.S. Appl. No. 18/364,776 entitled "Detecting Liquid Temperature For A Beverage Carbonation System", filed Aug. 3, 2023, 43 pages.
U.S. Appl. No. 18/493,031 entitled "Ratchet System For A Gas Canister In A Beverage System", filed Oct. 24, 2023, 67 pages.

* cited by examiner

MULTI-PURPOSE VALVE FOR A BEVERAGE SYSTEM

FIELD

The present disclosure generally relates to beverage systems.

BACKGROUND

Various beverage systems are available that dispense carbonated beverages, for example, carbonated water. In some instances, the carbonated water can be flavored. Such beverage systems can be used in various locations by consumers, such as in homes or offices, to carbonate liquid and dispense the carbonated fluid into a container on demand.

Beverage carbonation systems can provide the carbonated fluid by mixing in a mixing chamber carbon dioxide ($CO_2$) gas with water to dissolve the $CO_2$ in the water. The dissolution takes place at a significantly elevated pressure to reach the required concentration of dissolved $CO_2$. The carbonated fluid thereafter exits the mixing chamber for dispensing to a user. However, a residual amount of $CO_2$ may not be dissolved in the water and may remain in the mixing chamber after the carbonated fluid has been dispensed. This residual amount of $CO_2$ remaining in the mixing chamber may adversely affect a subsequent formation of a carbonated fluid since its amount is unknown and cannot be taken into account in introducing a particular amount of $CO_2$ into the mixing chamber to form the subsequent carbonated fluid.

Additionally, beverage carbonation systems configured for consumer use, such as by being placed on a countertop in a home or an office, have a limited amount of internal real estate for components so that the beverage carbonation system has a small enough size suitable for consumer use. However, some components are traditionally needed for dispensing of a carbonated fluid and additional components are traditionally needed for removal of residual $CO_2$ from a mixing chamber. All of these components occupy space inside the beverage carbonation system such that the overall size of the beverage carbonation system is increased and/or one or more other desirable components must be omitted from the beverage carbonation system due to space limitations.

Accordingly, there remains a need for improved devices, systems, and methods for beverage systems.

SUMMARY

In general, systems, devices, and methods for a beverage system are provided.

In one aspect, a beverage system is provided that in one embodiment includes a mixing chamber and a valve. A carbonated fluid is configured to be formed in the mixing chamber by mixing a liquid and carbon dioxide. The valve is configured to receive the carbonated fluid from the mixing chamber and to receive residual carbon dioxide from the mixing chamber. The valve has a first state, in which the carbonated fluid cannot flow through the valve and the residual carbon dioxide cannot flow through the valve, a second state, in which the carbonated fluid cannot flow through the valve and the residual carbon dioxide can flow through the valve, and a third state in which the carbonated fluid can flow through the valve and the residual carbon dioxide can flow through the valve.

The beverage system can have any number of variations. For example, the valve can be configured to move from the first state to the second state, from the second state to a selected one of the first and third states, and from the third state to the second state. Further, the beverage system can also include a processor configured to control the movement of the valve from the first state to the second state, from the second state to the selected one of the first and third states, and from the third state to the second state.

For another example, with the valve in the third state, the carbonated fluid can be configured to flow through the valve and be dispensed into a beverage container from a carbonation system that includes the valve and the mixing chamber, and, with the valve in either the second state or the third state, the residual carbon dioxide can be configured to flow through the valve and be vented from a carbonation system that includes the valve and the mixing chamber.

For yet another example, the valve can define a first flow path therethrough along which the carbonated fluid is configured to pass through the valve with the valve in the third state, the valve can define a second flow path therethrough along which the residual carbon dioxide is configured to pass through the valve with the valve in either the second state or the third state, and the first and second flow paths can not cross or overlap.

For still another example, the valve can include main body, a lead screw, and a spool, the lead screw and the spool can be disposed in the main body, and the spool can be threadably engaged with the lead screw. Further, the lead screw can be configured to rotate relative to the main body, thereby causing the spool to move linearly relative to the main body and move the valve from the first state to the second state, from the second state to a selected one of the first and third states, or from the third state to the second state; the beverage system can also include a plurality of seals disposed in the main body and extending circumferentially around the spool; an interior of the main body can define a stepped shape of varying diameters, and an exterior of the spool can define a stepped shape of varying diameters corresponding to the stepped shape of the main body; and/or the main body can defines a first inlet for the carbonated fluid, a first outlet for the carbonated fluid, a second inlet for the residual carbon dioxide, and a second outlet for the carbon dioxide. Further, the beverage system can also include a motor configured to drive the rotation of the lead screw; the beverage system can also include a flexible seal disposed in the first outlet; and/or with the valve in the first state, the spool can be configured to prevent the carbonated fluid from entering the first inlet and passing through the valve to the first outlet and is configured to prevent the residual carbon dioxide from entering the second inlet and passing through the valve to the second outlet, with the valve in the first state, the spool can be configured to prevent the carbonated fluid from entering the first inlet and passing through the valve to the first outlet and is configured to allow the residual carbon dioxide to enter the second inlet and pass through the valve to the second outlet, and, with the valve in the first state, the spool can be configured to allow the carbonated fluid to enter the first inlet and pass through the valve to the first outlet and is configured to allow the residual carbon dioxide to enter the second inlet and pass through the valve to the second outlet. Further, the beverage system can also include a processor configured to control the motor. Further, the beverage system can also include a plurality of sensors operatively coupled with the processor, and the processor can be configured to control the motor based on whether or not a signal is received from each of the plurality of sensors.

For another example, the mixing chamber can be configured to receive the liquid from a liquid source in fluid communication with the mixing chamber and to receive the carbon dioxide from a gas source in fluid communication with the mixing chamber.

In another aspect, a method for a beverage system is provided that in one embodiment includes causing a valve of the beverage system to move from a first state to a second state and from the second state to a third state. The beverage system also includes a mixing chamber. A carbonated fluid is configured to be formed in the mixing chamber by mixing a liquid and carbon dioxide. The valve is configured to receive the carbonated fluid from the mixing chamber and to receive residual carbon dioxide from the mixing chamber. The valve has the first state, in which the carbonated fluid cannot flow through the valve and the residual carbon dioxide cannot flow through the valve, the second state, in which the carbonated fluid cannot flow through the valve and the residual carbon dioxide can flow through the valve, and the third state in which the carbonated fluid can flow through the valve and the residual carbon dioxide can flow through the valve.

The method can have any number of variations. For example, the valve can be configured to move from the first state to the second state, from the second state to a selected one of the first and third states, and from the third state to the second state. Further, the beverage system can also include a processor configured to control the movement of the valve from the first state to the second state, from the second state to the selected one of the first and third states, and from the third state to the second state.

For another example, with the valve in the third state, the carbonated fluid can be configured to flow through the valve and be dispensed into a beverage container from a carbonation system that includes the valve and the mixing chamber, and, with the valve in either the second state or the third state, the residual carbon dioxide can be configured to flow through the valve and be vented from a carbonation system that includes the valve and the mixing chamber.

For yet another example, the valve can define a first flow path therethrough along which the carbonated fluid is configured to pass through the valve with the valve in the third state, the valve can define a second flow path therethrough along which the residual carbon dioxide is configured to pass through the valve with the valve in either the second state or the third state, and the first and second flow paths can not cross or overlap.

For still another example, the valve can include main body, a lead screw, and a spool, the lead screw and the spool can be disposed in the main body, and the spool can be threadably engaged with the lead screw. Further, the lead screw can be configured to rotate relative to the main body, thereby causing the spool to move linearly relative to the main body and move the valve from the first state to the second state, from the second state to a selected one of the first and third states, or from the third state to the second state; the beverage system can also include a plurality of seals disposed in the main body and extending circumferentially around the spool; an interior of the main body can define a stepped shape of varying diameters, and an exterior of the spool can define a stepped shape of varying diameters corresponding to the stepped shape of the main body; and/or the main body can defines a first inlet for the carbonated fluid, a first outlet for the carbonated fluid, a second inlet for the residual carbon dioxide, and a second outlet for the carbon dioxide. Further, the beverage system can also include a motor configured to drive the rotation of the lead screw; the beverage system can also include a flexible seal disposed in the first outlet; and/or with the valve in the first state, the spool can be configured to prevent the carbonated fluid from entering the first inlet and passing through the valve to the first outlet and is configured to prevent the residual carbon dioxide from entering the second inlet and passing through the valve to the second outlet, with the valve in the first state, the spool can be configured to prevent the carbonated fluid from entering the first inlet and passing through the valve to the first outlet and is configured to allow the residual carbon dioxide to enter the second inlet and pass through the valve to the second outlet, and, with the valve in the first state, the spool can be configured to allow the carbonated fluid to enter the first inlet and pass through the valve to the first outlet and is configured to allow the residual carbon dioxide to enter the second inlet and pass through the valve to the second outlet. Further, the beverage system can also include a processor configured to control the motor. Further, the beverage system can also include a plurality of sensors operatively coupled with the processor, and the processor can be configured to control the motor based on whether or not a signal is received from each of the plurality of sensors.

For another example, the mixing chamber can be configured to receive the liquid from a liquid source in fluid communication with the mixing chamber and to receive the carbon dioxide from a gas source in fluid communication with the mixing chamber.

In another embodiment, a method for a beverage system includes forming a carbonated fluid in a mixing chamber of a carbonation system, and, after the formation of the carbonated fluid, changing a state of a valve of the carbonation system such that residual carbon dioxide in the mixing chamber is allowed to enter and pass through the valve for venting out of the carbonation system, and thereafter changing the state of the valve again such that carbonated fluid in the mixing chamber is allowed to enter and pass through the valve for dispensing out of the carbonation system into a beverage container.

The method can have any number of variations. For example, a processor of the carbonation system can control the formation of the carbonation fluid and can control the changing of the state of the valve.

BRIEF DESCRIPTION OF DRAWINGS

This disclosure will be more fully understood from the following detailed description taken in conjunction with the accompanying drawings, in which.

DETAILED DESCRIPTION

Figure 1A:
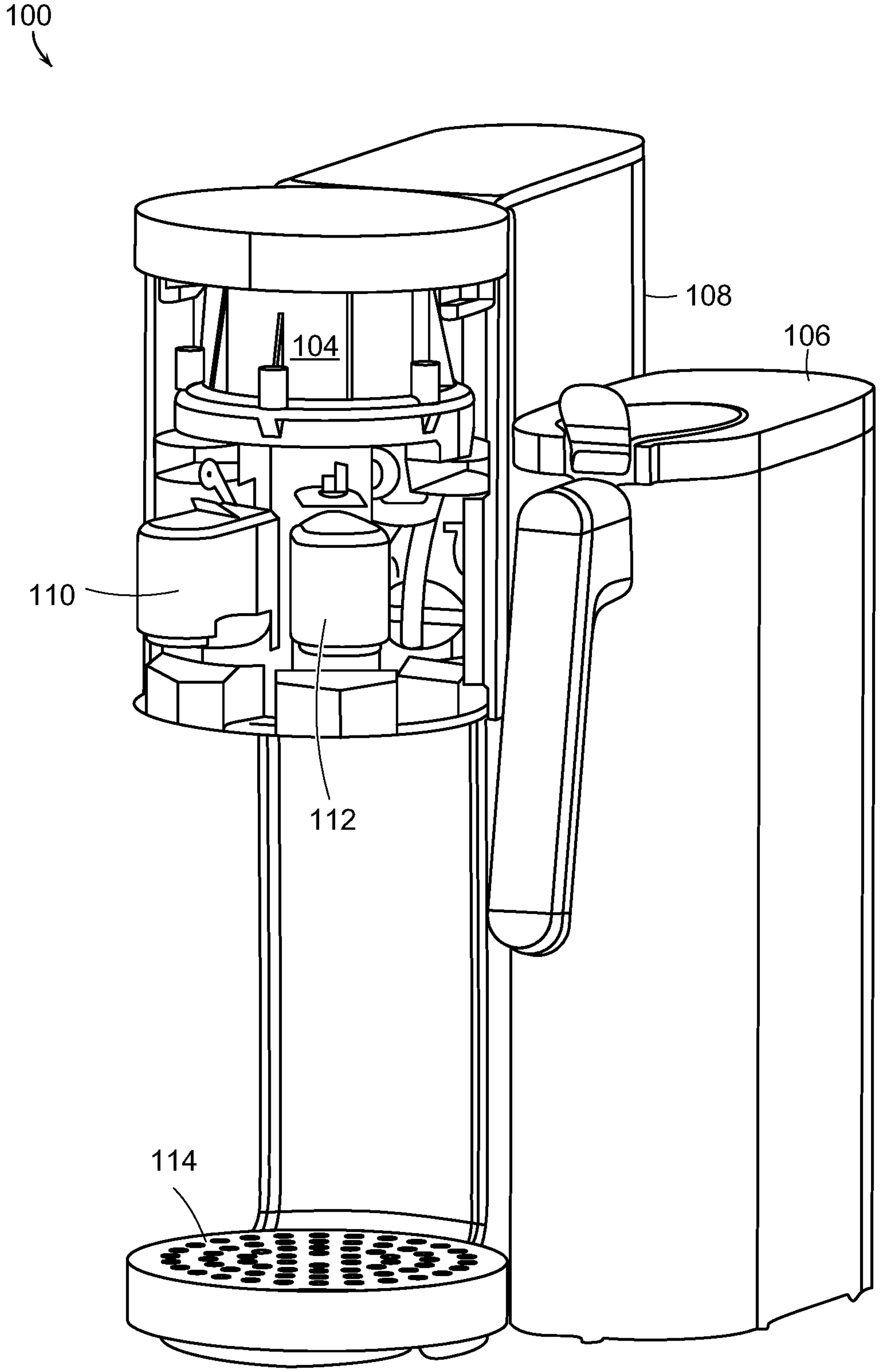
FIG. 1A is a partial perspective view of one embodiment of a carbonation system with a cover omitted therefrom.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. A person skilled in the art will also recognize that a value may not be precisely at a value but nevertheless considered to be substantially at that value due to any number of factors, such as manufacturing tolerances and sensitivity of measurement equipment.

Various illustrative systems, devices, and methods for beverage systems are provided. In general, a beverage system is configured to form a beverage and dispense the beverage into a container, such as a bottle, a cup, or other container. The beverage system can be a carbonation system configured to form a carbonated fluid and dispense the carbonated fluid into a container. In an exemplary embodiment, the beverage system includes a multi-purpose valve configured to control the dispensing of the carbonated fluid and to control venting of gas. The venting of the gas releases residual gas that was not dissolved in liquid in forming the carbonated fluid and thus remains in the beverage system's mixing chamber after formation of the carbonated fluid. The mixing chamber may thus be substantially free of gas after a carbonated fluid is formed, thereby preparing the mixing chamber for an effective subsequent carbonated fluid formation process with a known amount of gas (e.g., substantially zero gas) in the mixing chamber at a start of the subsequent carbonated fluid formation process.

The valve being a multi-purpose valve configured for use in connection with both carbonated fluid dispensing and gas venting may help free space inside the beverage system that would otherwise be occupied by components for dispensing of a carbonated fluid and by additional components for removal of residual gas from a mixing chamber. An overall size and/or weight of the beverage system may thus be reduced, thereby making the beverage system better suited for consumer use in a home, office, or elsewhere, and/or other desirable components may be included in the beverage system because fewer components need to be included in the beverage system to effectively accomplish fluid dispensing and gas venting.

The systems, devices, and methods described herein are not limited to carbonation systems in which a liquid is mixed with $CO_2$ to form a treated fluid in the form of a carbonated fluid intended to be a beverage. A beverage carbonation system is one example of a treatment system to which the systems, devices, and methods described herein apply. Other treatment systems are generally configured and used similar to the carbonation systems described herein except instead of mixing $CO_2$ with a liquid, a different gas is mixed with the liquid. The resulting fluid is a treated fluid but is not a "carbonated" fluid.

Figure 1B:
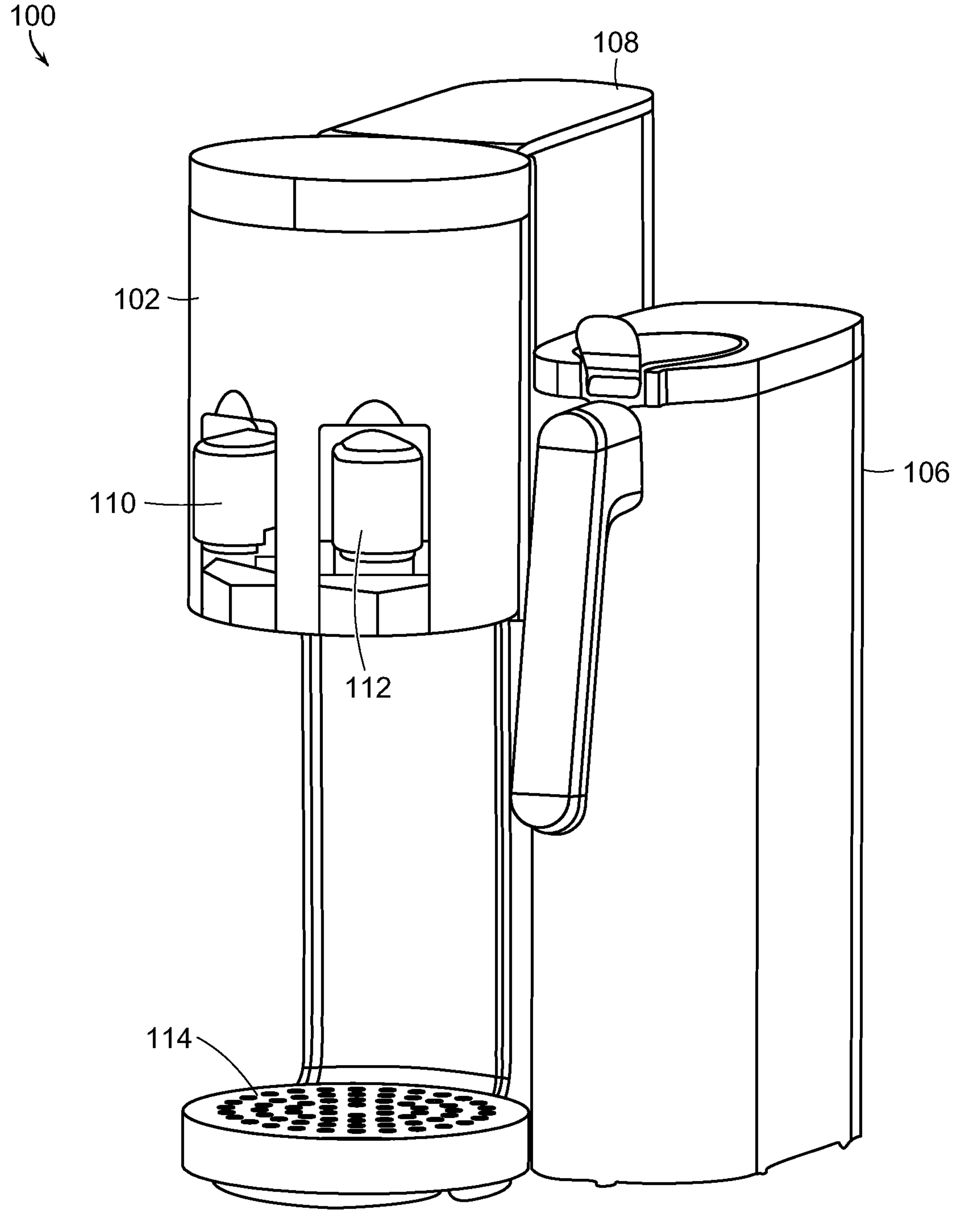
FIG. 1B is another perspective view of the carbonation system of FIG. 1A with the cover.

FIGS. 1A and 1B illustrate one embodiment of a carbonation system 100 configured to form a carbonated fluid. A cover 102 of the carbonation system 100 is omitted in FIG. 1A to show a mixing chamber 104 of the carbonation system 100 in which a carbonated fluid is formed. Various embodiments of mixing chambers are described, for example, in U.S. Pat. No. 11,612,865 entitled "Agitator For A Carbonation System" issued Mar. 28, 2023, which is hereby incorporated by reference in its entirety.

The carbonation system 100 also includes a liquid source (also referred to herein as a "liquid reservoir") 106 configured to be a source of liquid for mixing in the mixing chamber 104, a flow meter (obscured in FIGS. 1A and 1B) configured to regulate an amount of liquid that flows from the liquid source 106 to the mixing chamber 104, and a pump (obscured in FIGS. 1A and 1B) configured to pump liquid from the liquid source 106 to the mixing chamber 104. The liquid source 106 is a pitcher in this illustrated embodiment, but other liquid sources may be used. The liquid is water in this illustrated embodiment such that the liquid source 106 is a water reservoir, but another liquid can be used, such as juice. The pump for the liquid can be a pump such as a high pressure pump, a low pressure, high flow rate pump, or other type of pump. In some embodiments, the liquid reservoir can be integral to the carbonation system 100, such as by being a built-in refillable tank or other refillable reservoir, instead of being configured to releasably couple to the carbonation system 100. Various embodiments of carbonation systems configured to be in selective fluid communication with a liquid source are described, for example, in U.S. Pat. No. 11,751,585 entitled "Flavored Beverage Carbonation System" issued Sep. 12, 2023, U.S. Pat. No. 11,745,996 entitled "Ingredient Containers For Use With Beverage Dispensers" issued Sep. 5, 2023, U.S. patent application Ser. No. 17/821,212 entitled "Beverage Carbonation System Flow Control" filed Aug. 22, 2022, and U.S. patent application Ser. No. 18/364,776 entitled "Detecting Liquid Temperature For A Beverage Carbonation System" filed Aug. 3, 2023, which are hereby incorporated by reference in their entireties.

The mixing chamber 104 is configured to receive liquid therein through a liquid inlet (obscured in FIGS. 1A and 1B) operably coupled to the liquid source 106 (e.g., through liquid tubing and/or other components) and is configured to receive gas therein through a gas inlet (obscured in FIGS. 1A and 1B) operably coupled to a gas source (obscured in FIGS. 1A and 1B) of the carbonation system 100 (e.g., through gas tubing and/or other components). Carbonated fluid formed in the mixing chamber 104, e.g., by mixing the liquid and the gas, is configured to be dispensed from the carbonation system 100, e.g., to a cup or other container positioned on a container base 114 of the carbonation system 100. Excess gas not dispensed from the mixing chamber 104 is configured to be vented from the mixing chamber 104 to prepare the mixing chamber 104 for a next carbonated fluid formation process. As discussed herein, the carbonation system 100 includes a multi-purpose valve (obscured in FIGS. 1A and 1B) configured to control the dispensing of the carbonated fluid and the venting of the gas.

The carbonation system 100 also includes an air pump (obscured in FIGS. 1A and 1B) configured to drive a flow of the carbonated fluid out of the mixing chamber through the multi-purpose valve. The multi-purpose valve is configured to selectively open, as discussed further herein, to allow the carbonated fluid to exit the mixing chamber and out of the carbonation system 100, e.g., for dispensing into a container such as a cup, a bottle, etc. The air pump is configured to pump air into the mixing chamber such that, with a liquid flow path of the multi-purpose valve open, the carbonated fluid in the mixing chamber is forced out of the mixing chamber and out of the carbonation system 100 through the multi-purpose valve.

In some embodiments, a pressure within the mixing chamber in combination with resistance of an output channel can be configured to drive a flow of the carbonated fluid out of the mixing chamber through the multi-purpose valve before the air pump is actuated to pump air into the mixing chamber. Various embodiments of such flow control are described, for example, in U.S. patent application Ser. No. 17/821,212 entitled "Beverage Carbonation System Flow Control" filed Aug. 22, 2022, which is hereby incorporated by reference in its entirety.

The gas source is configured to be a source of gas for mixing in the mixing chamber 104. The carbonation system 100 also includes a gas regulator (obscured in FIGS. 1A and 1B) configured to regulate an amount of gas that flows from the gas source to the mixing chamber 104 and includes a gas solenoid valve (obscured in FIGS. 1A and 1B) configured to open and close to selectively allow the gas to flow from the gas source 112 to the mixing chamber 104. The gas is $CO_2$ in this illustrated embodiment such that the gas source is a $CO_2$ source in the form of a $CO_2$ cylinder (also referred to herein as a "$CO_2$ canister"), but another gas can be used (in which case, as mentioned above, the fluid dispensed would not be a "carbonated" fluid but would be a treated fluid). The gas regulator can be, for example, an 0.8 MPa gas regulator, a 0.65 MPa gas regulator, or other gas regulator. The gas regulator can be configured to allow a high flow rate of gas when it is open so that the operation of the process takes less time as compared to use of a low flow rate of gas.

The gas source in this illustrated embodiment is configured to be removably coupled to the carbonation system 100. The gas source is thus configured to be replaced by a user, either by being replaced with the same gas source refilled with gas or replaced with another gas source. A user may replace the gas source at any time of the user's choosing. Various embodiments of coupling a gas source to a carbonation system are described, for example, in U.S. patent application Ser. No. 18/493,031 entitled "Ratchet System For A Gas Canister In A Beverage System" filed Oct. 24, 2023, which is hereby incorporated by reference in its entirety.

The carbonation system 100 in this illustrated embodiment is configured to selectively dispense first and second additives from first and second consumables 110, 112, respectively, into a container placed on the container base 114 of the carbonation system 100 that can also serve as a drip tray. Each of the first and second consumables 110, 112 includes one or more additives including any of a variety of ingredients, including, for example, flavorants, colorants, vitamins, minerals, chemicals, other ingredients, or any suitable combination of the foregoing. Selected additive(s) can be dispensed into a cup (or other container) on the container base 114 before the carbonated fluid is dispensed, after the carbonated fluid is dispensed, or simultaneously with the dispensing of the carbonated fluid. However, the carbonation system 100 can be configured to add no additive or to add a different number of additives. Various embodiments of beverage systems configured to add additive(s) are described, for example, in U.S. Pat. No. 11,751,585 entitled "Flavored Beverage Carbonation System" issued Sep. 12, 2023, U.S. Pat. No. 11,745,996 entitled "Ingredient Containers For Use With Beverage Dispensers" issued Sep. 5, 2023, and U.S. patent application Ser. No. 18/099,690 entitled "Venting A Chamber In A Beverage Carbonation System" filed Jan. 20, 2023, which are hereby incorporated by reference in their entireties.

The carbonation system 100 also includes a processor (obscured in FIGS. 1A and 1B), such as a microcontroller that includes a processor and a memory, or other type of processor, disposed in a housing 108 of the carbonation system. In general, the processor is configured to execute instructions stored in a memory (obscured in FIGS. 1A and 1B) disposed in the housing 108 to cause various actions to occur, such as control of the carbonation system's multi-purpose valve for dispensing of a carbonated fluid, control of the carbonation system's multi-purpose valve for gas venting, causing the first additive(s) to be dispensed from the first consumable 110, causing the second additive(s) to be dispensed from the second consumable 112, causing an alert (e.g., an illuminated (solid or blinking) light, an emitted sound, etc.) to be provided to a user via a user interface of the carbonation system 100 when the carbonated fluid has finished being dispensed from the carbonation system 100, etc. Other embodiments of treatment systems described herein similarly include a processor and a memory.

Figure 2A:
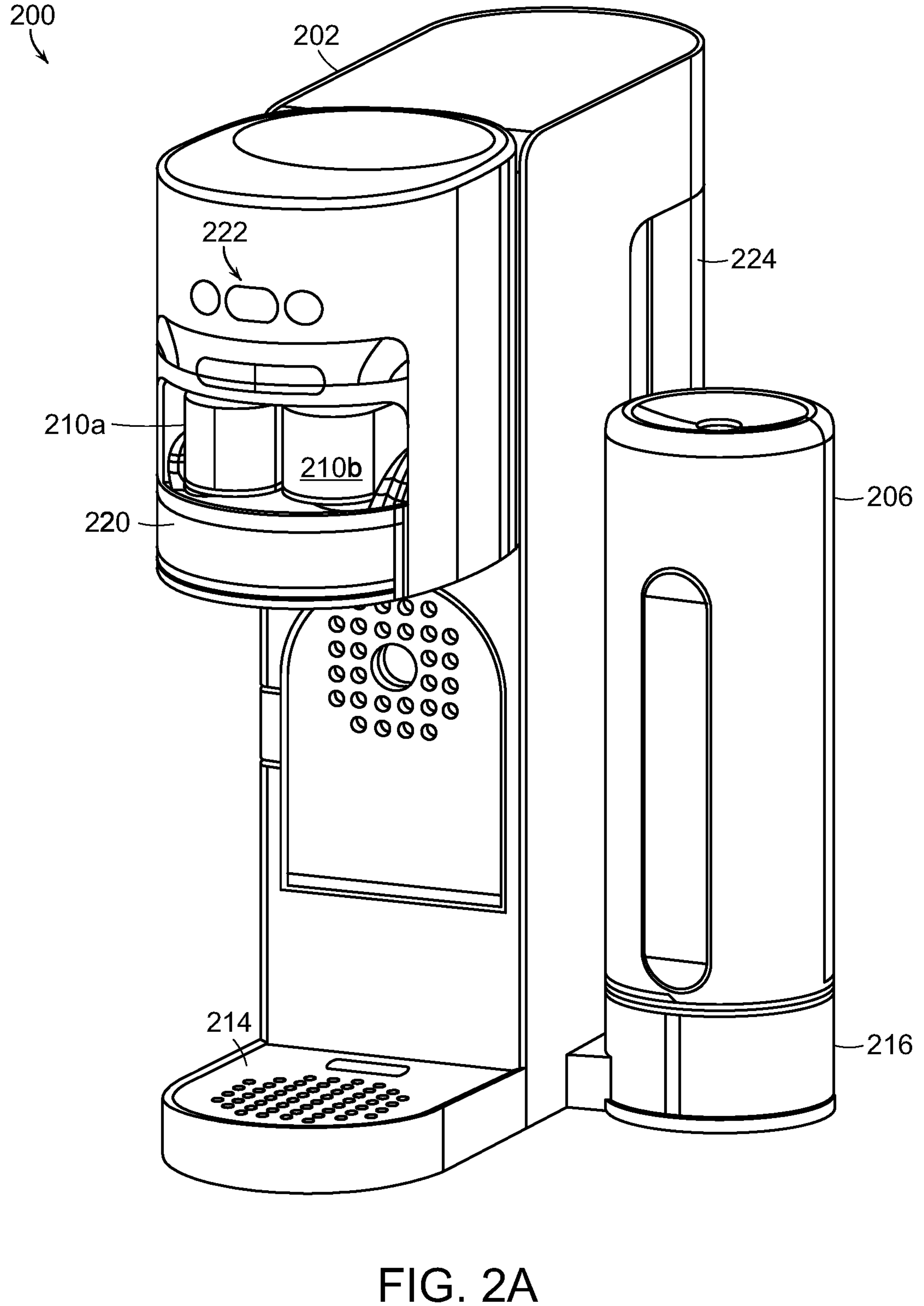
FIG. 2A is a perspective view of another embodiment of a carbonation system.
Figure 2B:
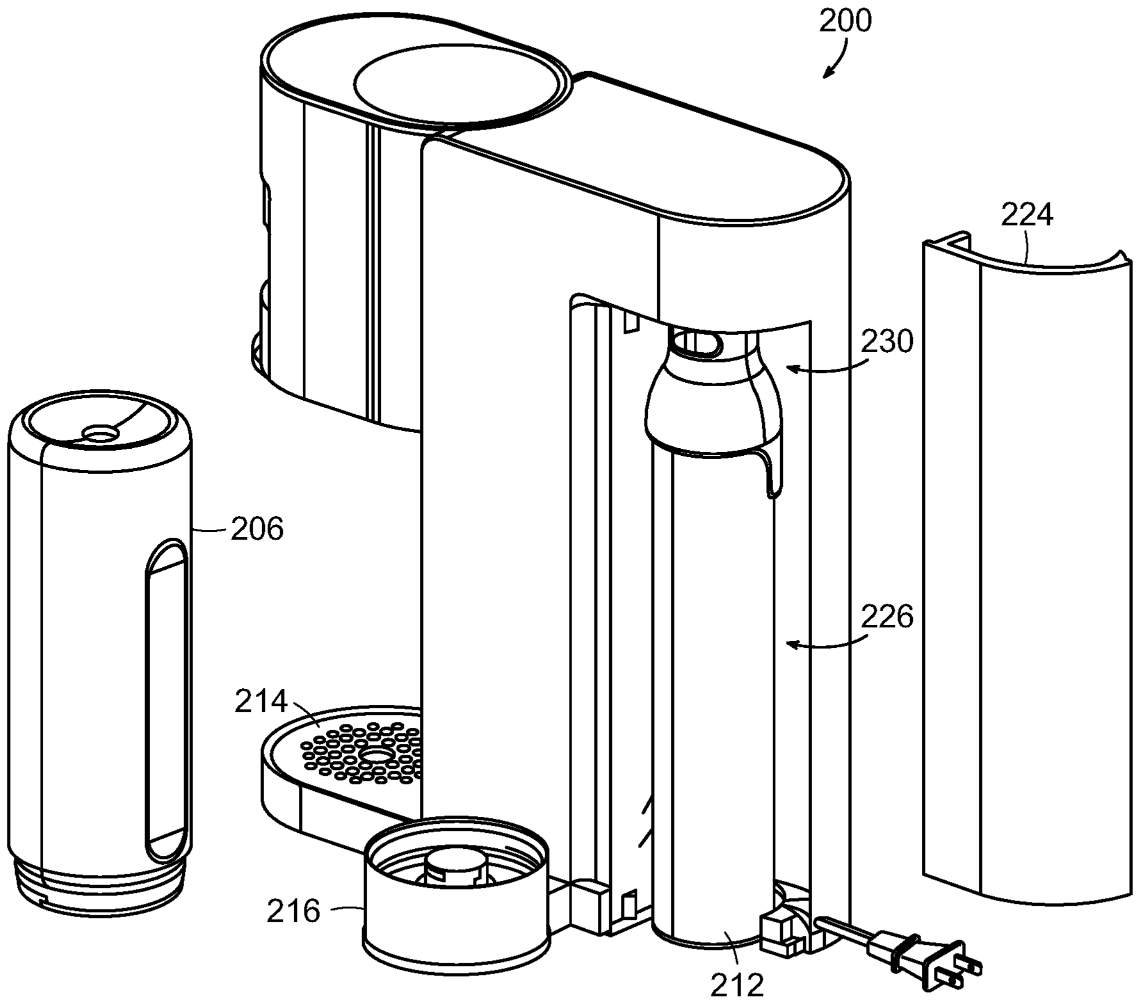
FIG. 2B is a perspective view of the carbonation system of FIG. 2A with a gas source chamber cover removed therefrom and with a liquid source released therefrom.
Figure 2C:
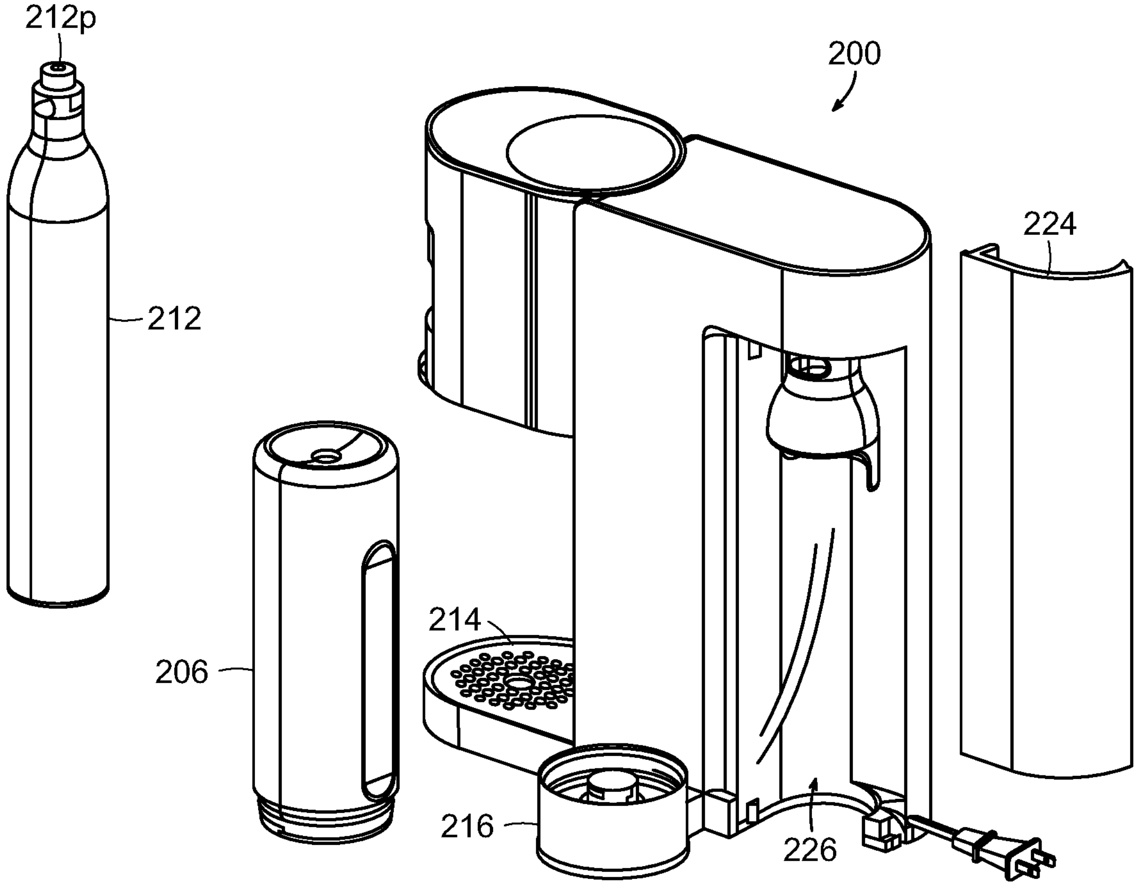
FIG. 2C is a perspective view of the carbonation system of FIG. 2B with a gas source removed from the gas source chamber.

FIGS. 2A-2C illustrate another embodiment of a carbonation system 200 configured to form a carbonated fluid. The carbonation system 200 can have a variety of configurations, such as a configuration similar to the carbonation system 100 of FIGS. 1A and 1B or other carbonation system described herein.

The carbonation system 200 includes a liquid source 206 in the form of a bottle configured to be releasably coupled to the carbonation system 200 that includes a mixing chamber (obscured in FIGS. 2A-2C) in which the liquid can be mixed with a gas. Other liquid sources can be used, and the bottle 206 can have any of a variety of configurations. The carbonation system 200 also includes a flow meter (obscured in FIGS. 2A-2C) and a liquid pump (obscured in FIGS. 2A-2C), similar to that discussed above. A check valve (obscured in FIGS. 2A-2C) is configured to automatically open in response to the liquid source 206 being seated in a base 216 of the carbonation system 200 to allow liquid, e.g., water, juice, etc., in the liquid source 206 to flow out of the liquid source 206 and into the mixing chamber. FIG. 2A shows the liquid source 206 removably coupled to the carbonation system 200 via the base 216. FIGS. 2B and 2C show the liquid source 206 as a standalone element not coupled to the carbonation system 200. In some embodiments, the liquid reservoir can be integral to the carbonation system 200, such as by being a built-in refillable tank or other refillable reservoir, instead of being configured to releasably couple to the carbonation system 200.

The carbonation system 200 in this illustrated embodiment is configured to selectively dispense first and second additives from first and second consumables 210*a*. 210*b*, respectively, into a container (not shown) placed on a container base 214 of the carbonation system 200 that can also serve as a drip tray. The carbonation system 200 includes a carriage assembly 220 configured to receive the first and second consumables 210*a*, 210*b*. However, as discussed above, the carbonation system 200 can be configured to add no additive or to add a different number of additives.

The carbonation system 200 includes a user interface 222 configured to receive input from a user regarding one or more aspects of the carbonation system 200 (e.g., volume of carbonated fluid to be dispensed, carbonation level, specific additives, additive amount, etc.) and/or configured to provide alerts (e.g., audible and/or visual) to the user regarding one or more aspects of the carbonation system 200 (e.g., status of whether the carbonated fluid has finished being dispensed from the carbonation system 200, power on/off status of the carbonation system 200, etc.).

The carbonation system 200 includes a gas source 212 configured to be removably coupled to the carbonation system 200. The gas source 212 in this illustrated embodiment is in the form of a $CO_2$ canister, but as mentioned above, other gas sources are possible. The gas source 212 is configured to removably couple to a gas source coupling assembly 230 of the carbonation system 200. Various embodiments of gas source coupling assemblies are described, for example, in U.S. patent application Ser. No. 18/493,031 entitled "Ratchet System For A Gas Canister In A Beverage System" filed Oct. 24, 2023, which is hereby incorporated by reference in its entirety.

The mixing chamber of the carbonation system 200 is configured to receive liquid therein through a liquid inlet (obscured in FIGS. 2A-2C) operably coupled to the liquid source 206 (e.g., through liquid tubing and/or other components) and is configured to receive gas therein through a gas inlet (obscured in FIGS. 2A-2C) operably coupled to the gas source 212 (e.g., through gas tubing and/or other components) that is removably coupled to the carbonation system 200. Carbonated fluid formed in the mixing chamber, e.g., by mixing the liquid and the gas, is configured to be dispensed from the carbonation system 200, e.g., to a cup or other container positioned on a container base 214 of the carbonation system 200. Excess gas not dispensed from the mixing chamber is configured to be vented from the mixing chamber to prepare the mixing chamber for a next carbonated fluid formation process. As discussed herein, the carbonation system 200 includes a multi-purpose valve (obscured in FIGS. 2A-2C) configured to control the dispensing of the carbonated fluid and the venting of the gas.

A gas source chamber cover 224 that forms part of and is releasably coupled to a housing 208 of the carbonation system 200 is released from the carbonation system's housing 202 in FIGS. 2B and 2C to show a gas source chamber 226 of the carbonation system 200 that is configured to removably receive the gas source 212 therein. The gas source chamber cover 224 in this illustrated embodiment is shown as being completely releasable from the housing 202, but in other embodiments can be partially releasable so as to open and provide access to the gas source chamber 226, e.g., by being a hinged door, by being slidable into a portion of the housing 202, etc. FIG. 2B shows the gas source 212 located in the gas source chamber 226 and removably coupled to the carbonation system 200. FIG. 2C shows the gas source 212 as a standalone element located outside of the gas source chamber 226 and not coupled to the carbonation system 200.

The gas source 212 includes a pin 212*p*, e.g., a valve pin, at an upper end of the gas source 212. The pin 212*p* is configured to move between an extended position, in which the gas source 212 is closed such that gas contained in the gas source 212 cannot be released from the gas source 212, and a compressed position, in which the pin 212*p* has moved to open a valve such that the gas source 212 is open such that gas can be released therefrom. With the gas source 212 open, gas is configured to be released therefrom to a gas regulator (obscured in FIGS. 2A-2C) of the carbonation system 200. The gas regulator is configured regulate an amount of gas that flows from the gas source 212 to the carbonation system's mixing chamber. From the gas regulator, the gas is configured to flow out of an outlet (obscured in FIGS. 2A-2C) toward the mixing chamber.

Figure 2D:
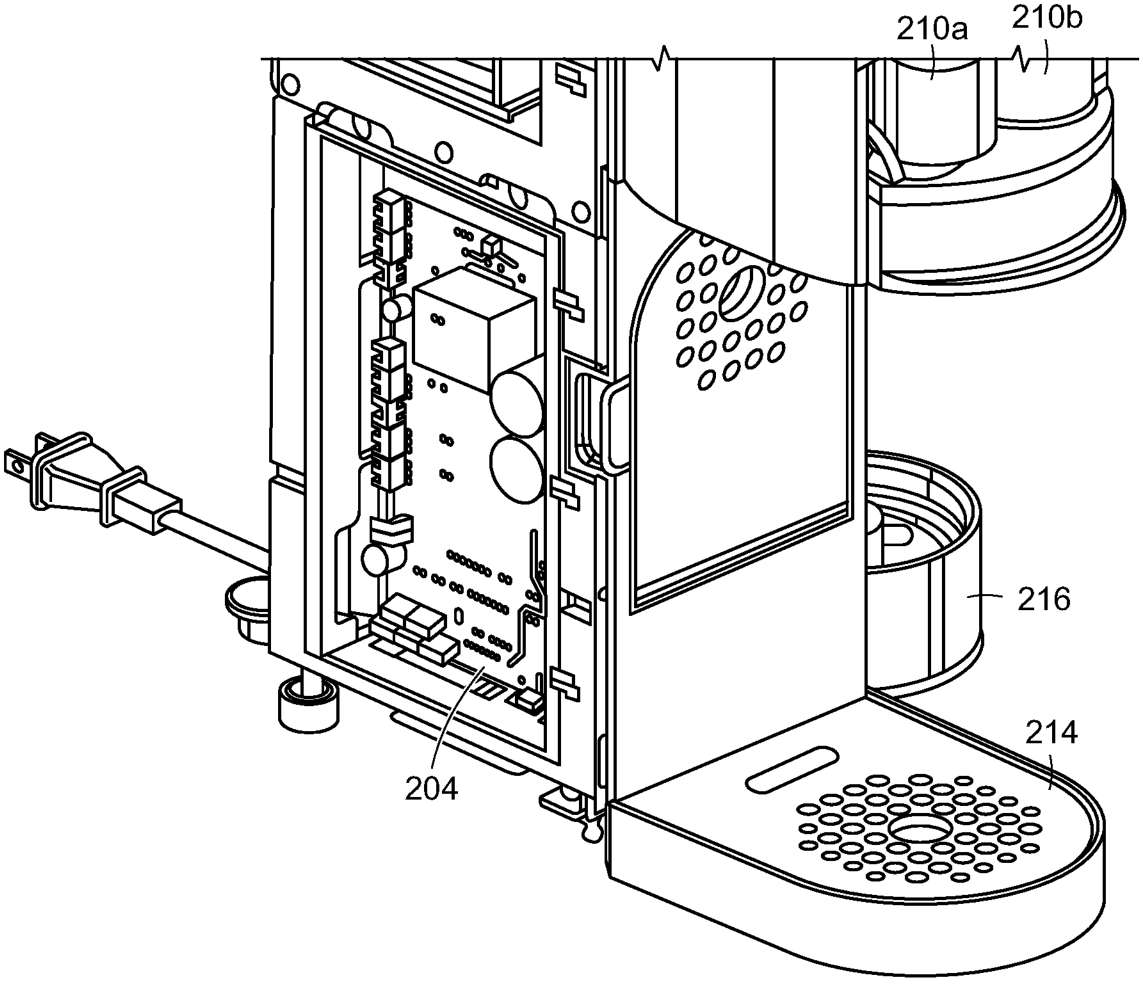
FIG. 2D is a perspective view of a partial portion of the carbonation system of FIG. 2A.

As shown in FIG. 2D, the carbonation system 200 also includes a printed circuit board (PCB) 204 disposed in the housing 202 and including various components, such as a processor (e.g., a microcontroller that includes a processor and a memory, or other type of processor) and a memory, configured to facilitate operation of the carbonation system 200. The PCB 204 can have a variety of configurations and, in some embodiments, the processor and memory can be included in the carbonation system 200 without use of a PCB. In general, the processor is configured to execute instructions stored in the memory to cause various actions to occur, such as moving the multi-purpose valve of the carbonation system 200 to dispense carbonated fluid, moving the multi-purpose valve of the carbonation system 200 to vent gas from the mixing chamber, causing the first additive(s) to be dispensed from the first additives) consumable 210*a*, causing the second additive(s) to be dispensed from the second consumable 210*b*, causing an alert (e.g., an illuminated (solid or blinking) light, an emitted sound, etc.) to be provided to a user when the carbonated fluid has finished being dispensed from the carbonation system 200, etc. Other embodiments of treatment systems described herein similarly include a PCB (or a processor and memory without use of a PCB).

Figure 3A:
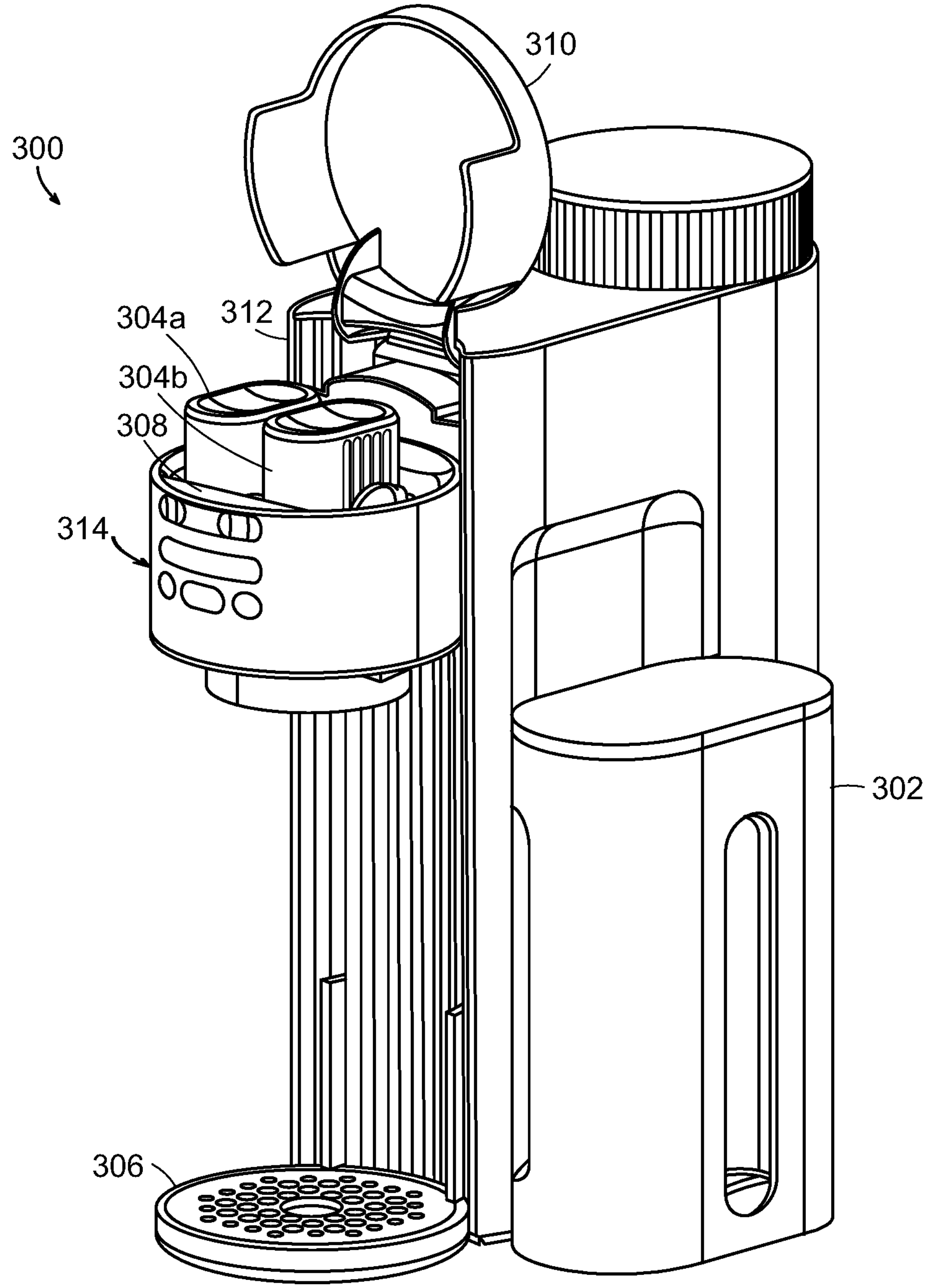
FIG. 3A is a perspective view of yet another embodiment of a carbonation system.

FIG. 3A illustrates another embodiment of a carbonation system 300 configured to form a carbonated fluid. The carbonation system 300 can have a variety of configurations, such as a configuration similar to the carbonation system 100 of FIGS. 1A and 1B, the carbonation system 200 of FIGS. 2A-2C, or other carbonation system described herein.

Figure 3B:
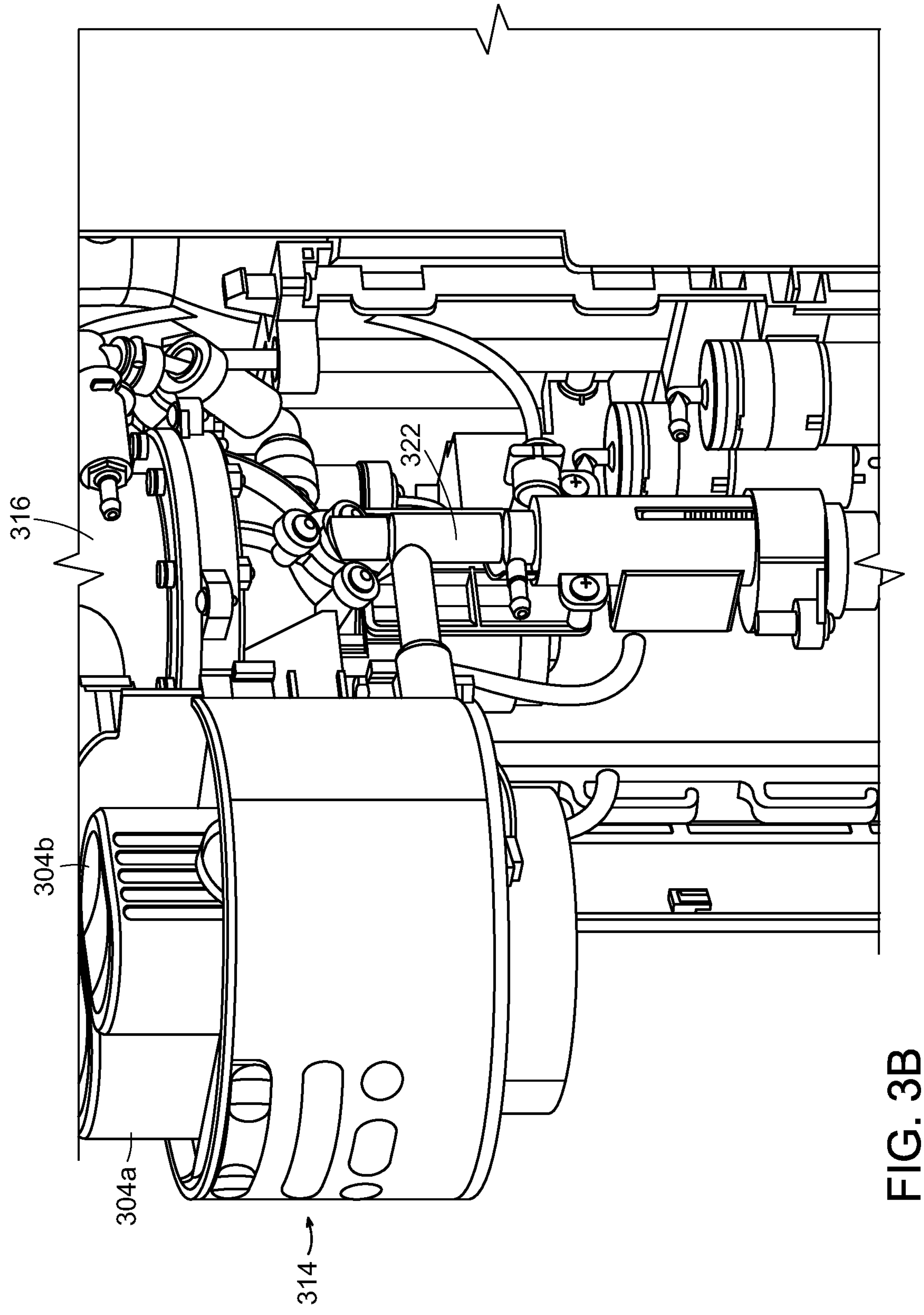
FIG. 3B is a perspective view of a portion of the carbonation system of FIG. 3A.

The carbonation system 300 includes a liquid source 302 in the form of a pitcher configured to be releasably coupled to the carbonation system 300 that includes a mixing chamber 316 (see FIG. 3B) in which the liquid can be mixed with a gas. Other liquid sources can be used, and the pitcher 302 can have any of a variety of configurations. The carbonation system 300 also includes a flow meter (obscured in FIG. 3A) and a liquid pump (obscured in FIG. 3A), similar to that discussed above. A check valve (obscured in FIG. 3A) is configured to automatically open in response to the liquid source 302 being coupled to the carbonation system 300 to allow liquid, e.g., water, juice, etc., in the liquid source 302 to flow out of the liquid source 302 and into the mixing chamber 316. FIG. 3A shows the liquid source 302 removably coupled to the carbonation system 300. In some embodiments, the liquid reservoir can be integral to the carbonation system 300, such as by being a built-in refillable tank or other refillable reservoir, instead of being configured to releasably couple to the carbonation system 300.

The carbonation system 300 in this illustrated embodiment is configured to selectively dispense first and second additives from first and second consumables 304*a*, 304*b*, respectively, into a container (not shown) placed on a container base 306 of the carbonation system 300 that can also serve as a drip tray. The carbonation system 300 includes a carriage assembly 308 configured to receive the first and second consumables 304*a*, 304*b*. However, as discussed above, the carbonation system 300 can be configured to add no additive or to add a different number of additives.

A cover 310 of the carbonation system 300 is shown in an open position in FIG. 3A. The cover 310 is hingedly attached to a housing 312 of the carbonation system 300 to allow the cover 310 to move between the open position, in which the first and second consumables 304*a*, 304*b* are accessible to a user for coupling to and removal from the carbonation system 300, and a closed position, in which the first and second consumables 304*a*, 304*b* are not accessible to a user. The cover 310 can be transparent to allow visualization of the first and second consumables 304*a*, 304*b* therethrough. The cover 310 can be attached to the housing 312 in other ways, such as via snap lock or other coupling mechanism. In some embodiments, the cover 310 can be fully removable from the housing 312.

The carbonation system 300 includes a user interface 314 configured to receive input from a user regarding one or more aspects of the carbonation system 300 (e.g., volume of carbonated fluid to be dispensed, carbonation level, specific additives, additive amount, etc.) and/or configured to provide alerts (e.g., audible and/or visual) to the user regarding one or more aspects of the carbonation system 300 (e.g., status of whether the carbonated fluid has finished being dispensed from the carbonation system 300, power on/off status of the carbonation system 300, etc.).

The carbonation system 300 includes a gas source (obscured in FIG. 3A) configured to be removably coupled to the carbonation system 300. The gas source in this illustrated embodiment is in the form of a $CO_2$ canister, but as mentioned above, other gas sources are possible. The gas source in this illustrated embodiment is configured to removably couple to a gas source coupling assembly (obscured in FIG. 3A) of the carbonation system 300. A gas source chamber cover 315 that forms part of and is releasably coupled to the housing 312 of the carbonation system 300 is configured to be released from the housing 312 to allow a user access to a gas source chamber (obscured in FIG. 3A) of the carbonation system 300 that is configured to removably receive the gas source therein.

Figure 3C:
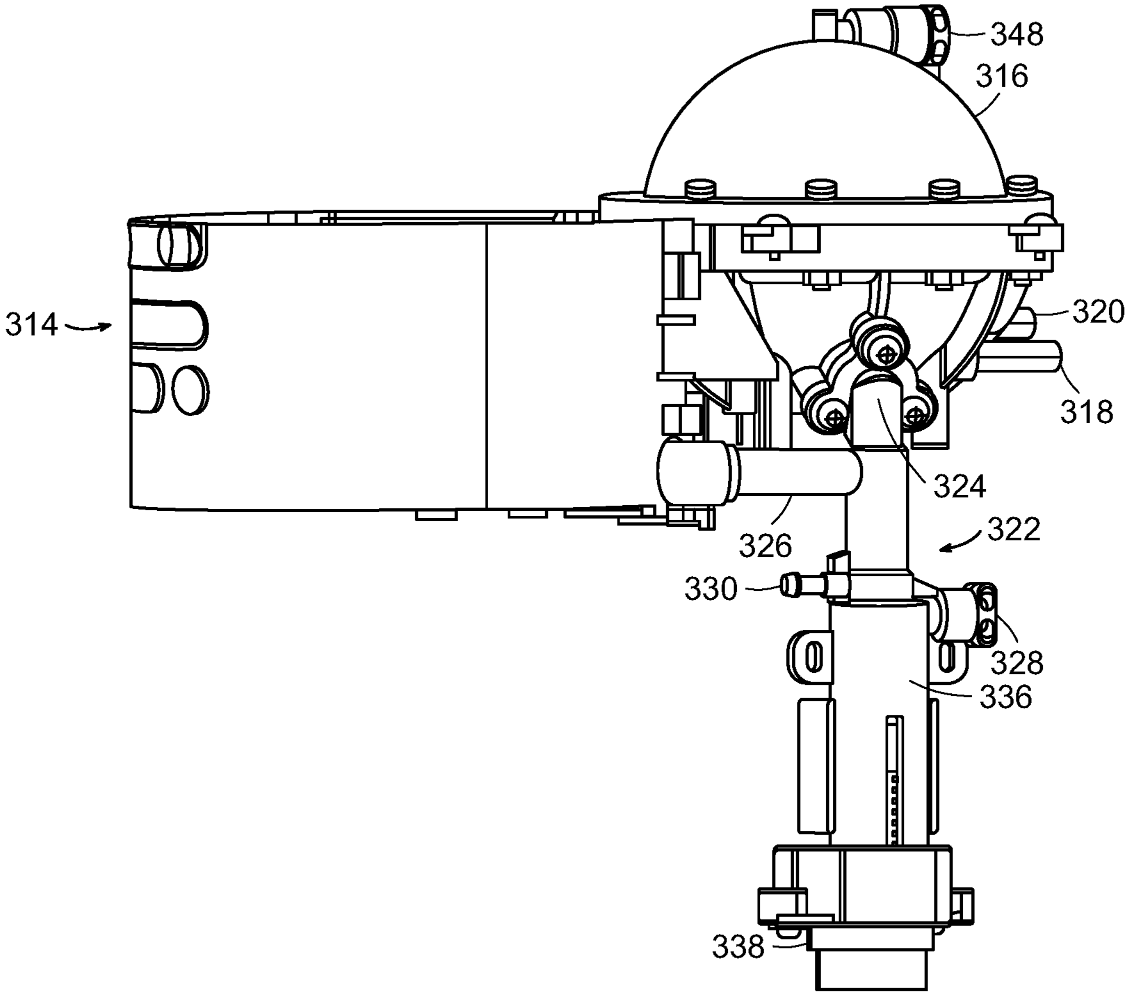
FIG. 3C is a perspective view of another portion of the carbonation system of FIG. 3A.
Figure 3D:
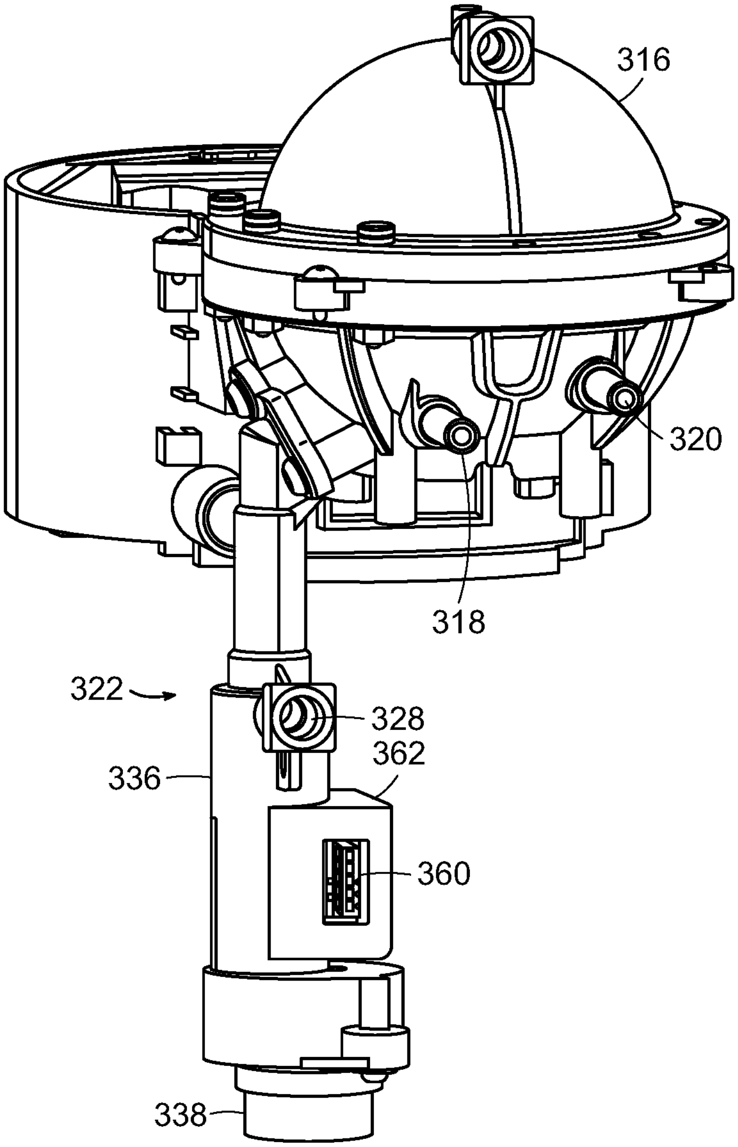
FIG. 3D is another perspective view of the portion of the carbonation system of FIG. 3C.

As shown in FIGS. 3C and 3D, the mixing chamber 316 of the carbonation system 300 is configured to receive liquid therein through a liquid inlet 318 operably coupled to the liquid source 306 (e.g., through liquid tubing and/or other components) and is configured to receive gas therein through a gas inlet 320 operably coupled to the gas source (e.g., through gas tubing and/or other components) that is removably coupled to the carbonation system 300. Carbonated fluid formed in the mixing chamber 316, e.g., by mixing the liquid and the gas, is configured to be dispensed from the carbonation system 300, e.g., to a cup or other container positioned on the container base 306. Excess gas not dispensed from the mixing chamber 316 is configured to be vented from the mixing chamber 316 to prepare the mixing chamber 316 for a next carbonated fluid formation process.

As shown in FIGS. 3B-3E, the carbonation system 300 includes a multi-purpose valve 322 configured to control the dispensing of the carbonated fluid and the venting of the gas. The valve 322 includes a liquid inlet 324 for carbonated fluid to enter the valve 322 from the mixing chamber 316, a liquid outlet 326 for carbonated fluid that enters the valve 322 through the liquid inlet 324, a gas inlet 328 for gas to enter the valve 322 from the mixing chamber 316, and a gas outlet 330 for gas that enters the valve 322 through the gas inlet 328. Depending on a state of the valve 322, zero, one, or both of the liquid outlet 326 and the gas outlet 328 is open. A single valve 322 is thus configured to control the dispensing of the carbonated fluid, e.g., through the liquid outlet 326, and the venting of the gas, e.g., through the gas outlet 328.

Figure 3E:
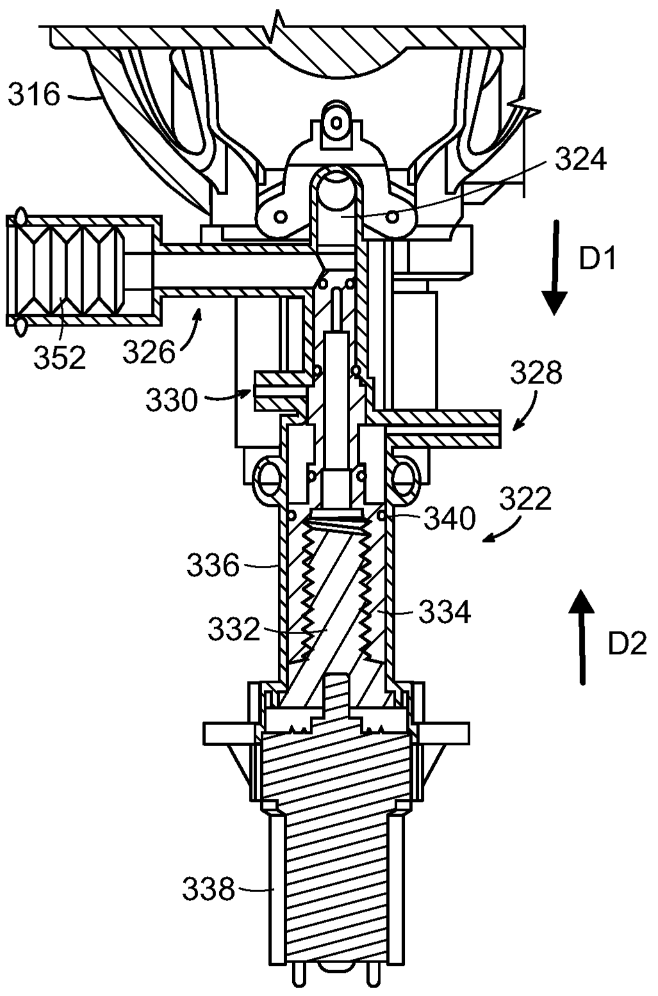
FIG. 3E is a cross-sectional side view of a portion of the carbonation system of FIG. 3A with a multi-purpose valve of the carbonation system in a third state.
Figure 3F:
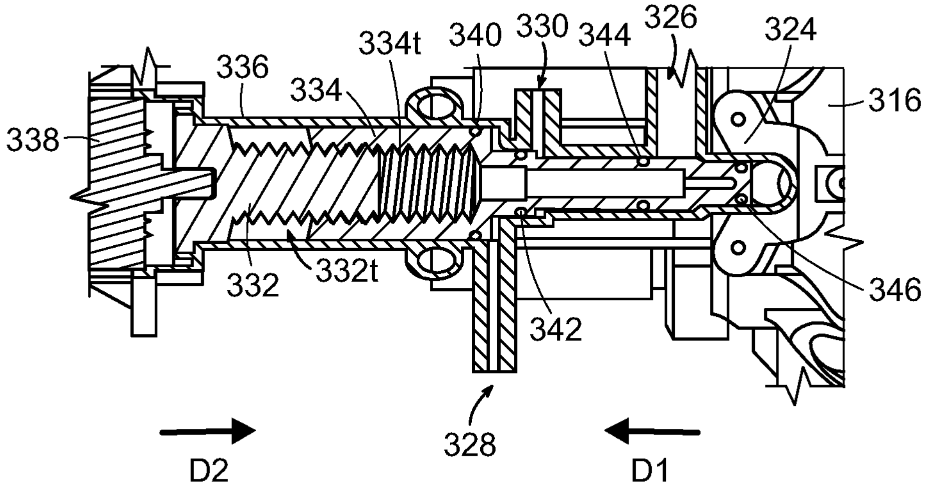
FIG. 3F is a cross-sectional side view of a portion of the carbonation system of FIG. 3A with the multi-purpose valve of the carbonation system in a first state.
Figure 3G:
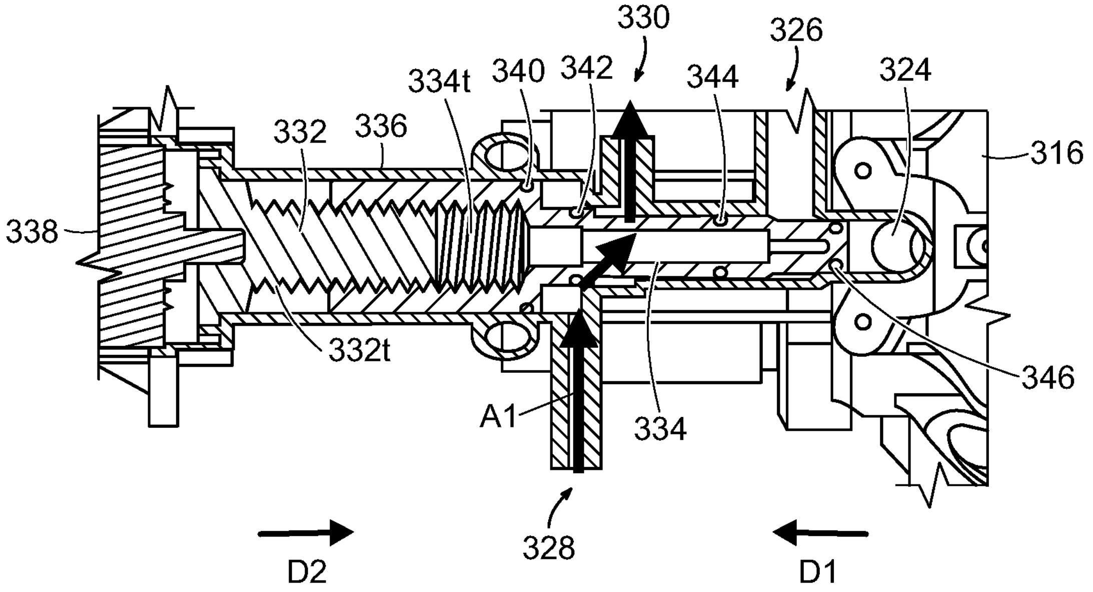
FIG. 3G is a cross-sectional side view of the portion of the carbonation system of FIG. 3F with the multi-purpose valve of the carbonation system in a second state.
Figure 3H:
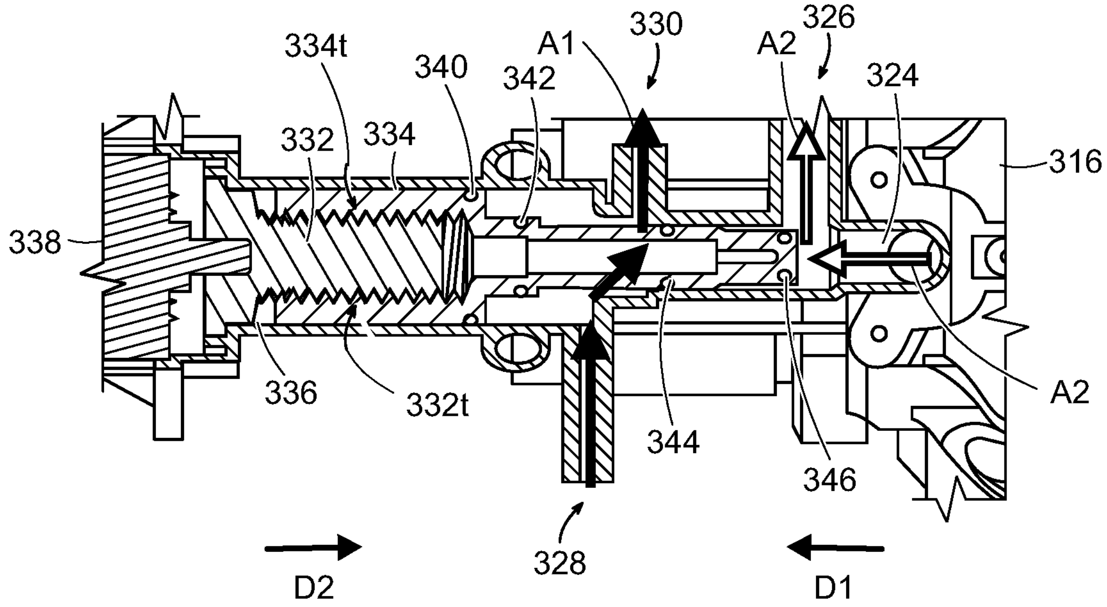
FIG. 3H is a cross-sectional side view of the portion of the carbonation system of FIG. 3F with the multi-purpose valve of the carbonation system in the third state.

The valve 322 is configured to move between first, second, and third states. FIG. 3E shows the valve 322 in the third state. FIGS. 3F-3H show the valve 322 in the first, second, and third states, respectively.

In the valve's first state, also referred to herein as a "closed state," the liquid inlet and outlet 324, 326 are closed and the gas inlet and outlet 328, 330 are closed. With the liquid inlet and outlet 324, 326 closed, liquid cannot flow into the valve 322 from the mixing chamber 316 and thus cannot flow out of the valve 322 through the liquid outlet 326 for dispensing from the carbonation system 300. With the gas inlet and outlet 328, 330 closed, gas cannot flow into the valve 322 from the mixing chamber 316 and thus cannot flow out of the valve 322 through the gas outlet 330 for venting purposes.

The valve 322 is configured to move from the first state to the second state and from the second state to either of the first and third states. In the valve's second state, also referred to herein as a "partially open state" or an "intermediate state," the liquid inlet and outlet 324, 326 are closed and the gas inlet and outlet 328, 330 are open. With the gas inlet and outlet 328, 330 open, gas can flow into the valve 322 from the mixing chamber 316 through the gas inlet 324 and flow out of the valve 322 through the gas outlet 330 for venting purposes, as shown in FIG. 3G (and FIG. 3H showing the valve's third state) via first arrows A1 indicating a gas flow path through the valve 322. Gas can thus begin venting from the mixing chamber 316 before carbonated fluid formed in the mixing chamber 316 begins passing through the valve 322 for dispensing from the carbonation system 300.

The valve 322 is configured to move from the third state to the second state. In the valve's third state, also referred to herein as an "open state," the liquid inlet and outlet 324, 326 are open and the gas inlet and outlet 328, 330 are open. With the liquid inlet and outlet 324, 326 open, liquid can flow into the valve 322 from the mixing chamber 316 through the liquid inlet 324 and flow out of the valve 322 through the liquid outlet 326 for dispensing from the carbonation system 300, as shown in FIG. 3H via second arrows A2 indicating a liquid flow path through the valve 322. As also shown in FIG. 3H, the gas and liquid flow paths do not cross or overlap.

The valve 322 includes a lead screw 332 and a spool 334 configured to cooperate with one another to move the valve 322 between the first, second, and third states. The lead screw 332 and the spool 334 are each disposed within a main body 336 of the valve 322. The lead screw 332 and the spool 334 are configured to move within and relative to the main body 336 to change the state of the valve 332. The main body 336 defines the liquid inlet and outlet 324, 326 and the gas inlet and outlet 328, 330.

The lead screw 332 is operably coupled to a motor 338. The motor 338 is configured to drive movement of the lead screw 332 relative to the main body 336 of the valve 322 to change the state of the valve 332. More particularly, the motor 338 is configured to drive rotation of the lead screw 332 about a longitudinal axis of the lead screw 332, such as by a rotor of the motor 338 rotating. The motor 338 is a DC motor in this illustrated embodiment, but other types of motors may be used.

The motor 338 is operatively coupled to the carbonation system's processor. The processor is configured to control operation of the motor 338, such as by transmitting a signal thereto the motor 338.

The lead screw 332 includes an external thread 332*t* that is threadably engaged with an internal thread 334*t* of the spool 334. The rotation of the lead screw 332, e.g., as driven by the motor 338, is configured to cause the spool 334 to move relative to the main body 336 of the valve 322 due to the threaded engagement of the lead screw's and spool's threads 332*t*. 334*t*. More particularly, the spool 334 is configured to move linearly, e.g., up and down in the view of FIG. 3E and left and right in the view of FIGS. 3F-3H, in response to the rotation of the lead screw 332. The lead screw 332 is thus configured to cooperate with the spool 334 to convert rotational motion to linear motion. A direction of the spool's linear movement is defined by a direction of the lead screw's rotation, e.g., clockwise or counterclockwise.

With the valve 322 in the first state, the lead screw's and spool's threads 332*t*, 334*t* are in a least threaded configuration, as shown in FIG. 3F. The lead screw 332 is in a fixed linear position with respect to the valve's main body 336 due to the lead screw's 332 coupling with the motor 338. The motor 338 driving the lead screw 322 with the valve 322 in the first state is configured to increase threading of the lead screw's and spool's threads 332*t*, 334*t* as the lead screw 332 rotates, with the spool 334 moving linearly relative to the valve's main body 336 in a first direction D1 away from the valve's liquid inlet 324 to move the valve 322 from the first state toward the second state.

Figure 3J:
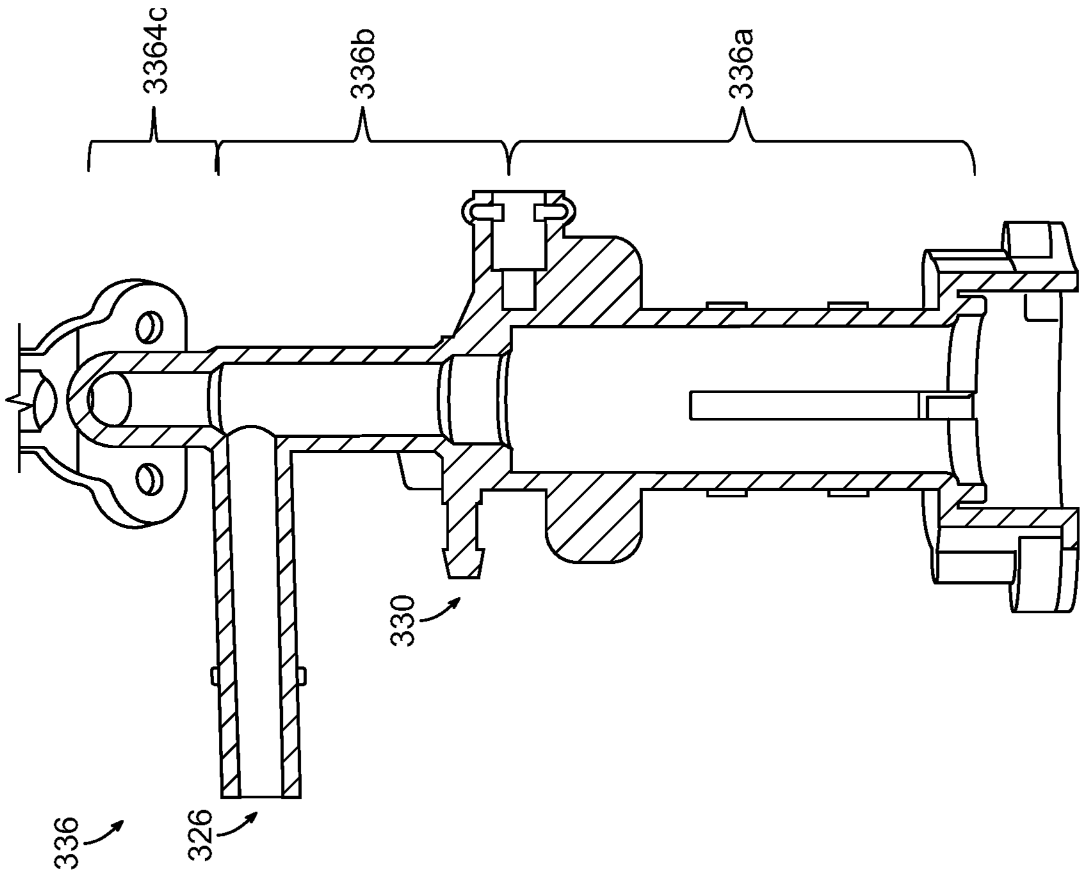
FIG. 3J is a cross-sectional side view of a main body of the multi-purpose valve of FIG. 3E.
Figure 3I:
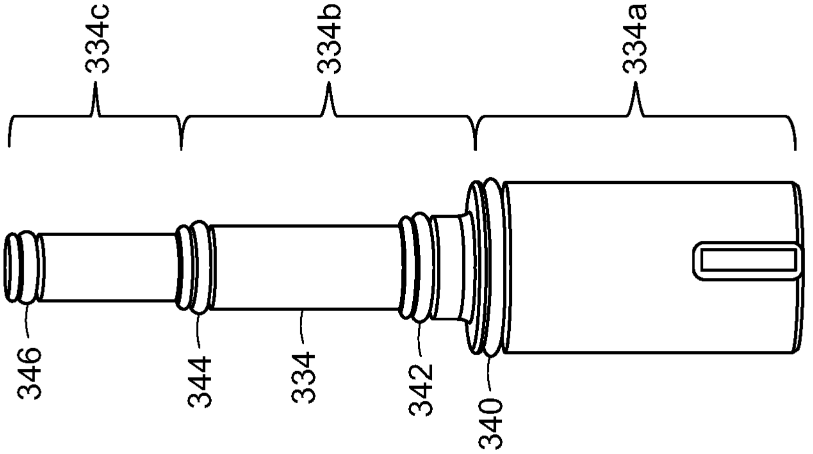
FIG. 3I is a perspective view of a spool and seals of the multi-purpose valve of FIG. 3E.

The spool 334 has an exterior with a stepped shape. As shown in FIG. 3I, the spool 334 includes first, second, and third portions 334*a*, 334*b*, 334*c* that each have a different outer diameter. The first portion 334*a* of the spool 334 has a largest outer diameter and is located nearest the lead screw 332 and the motor 338 of the spool's three portions 334*a*, 334*b*, 334*c*. The third portion 334*c* of the spool 334 has a smallest outer diameter and is located nearest the liquid inlet 324 of the spool's three portions 334*a*, 334*b*, 334*c*. The second portion 334*b* of the spool 334 has an outer diameter less than the first portion 334*a* and greater than the third portion 334*c*. The spool's second portion 334*b* is located between the spool's first and third portions 334*a*, 334*c*.

As shown in FIGS. 3F-3I, the valve 322 includes first, second, third, and fourth seals 340, 342, 344, 346. Each of the first, second, third, and fourth seals 340, 342, 344, 346 is disposed within the valve's main body 336 and extends circumferentially around the spool 334. Each of the first, second, third, and fourth seals 340, 342, 344, 346 is an o-ring in this illustrated embodiment, but other types of seals are possible.

As shown in FIG. 3I, the first seal 340 is located in the spool's first portion 334*a* at a first end of the spool's first portion 334*a* adjacent the spool's second portion 334*b*. A second, opposite end of the spool's first portion 334*a* is located nearer the motor 338 than the first end of the spool's first portion 334*a*. The second seal 342 is located in the spool's second portion 334*b* at a first end of the spool's second portion 334*b* adjacent the spool's first portion 334*a*. The third seal 344 is located in the spool's second portion 334*b* at a second, opposite end of the spool's second portion 334*b* adjacent the spool's third portion 334*c*. The fourth seal 346 is located in the spool's third portion 334*c* at a first end of the spool's third portion 334*c*. A second, opposite end of the spool's third portion 334*c* is located nearer the spool's second portion 334*b* than the first end of the spool's third portion 334*b*, which is nearer to the liquid inlet 324 than the second, opposite end of the spool's third portion 334*c*.

The valve's main body 336 has an interior with a stepped shape. As shown in FIG. 3J, the valve's main body 336 includes first, second, and third portions 336*a*, 336*b*, 336*c* that each have a different inner diameter. The first portion 336*a* of the main body 336 and is configured to seat the spool's first portion 334*a* therein. The third portion 336*c* of the main body 336 has a smallest outer diameter and is configured to seat the spool's third portion 334*c* therein. The second portion 336*b* of the main body 336 has an outer diameter less than the main body's first portion 336*a* and greater than the main body's third portion 336*c*. The main body's second portion 336*b* is configured to seat the spool's second portion 334*b* therein.

The first and second seals 340, 342 are associated with the gas flow path and thus are associated with the gas inlet and outlet 328, 330. The third and fourth seals 344, 346 are associated with the liquid flow path and thus are associated with the liquid inlet and outlet 324, 326. With the valve 322 in the first state, as shown in FIG. 3F, the first and second seals 340, 342 cooperate to help seal the gas flow path by being located on either side of the gas inlet 328 with the first seal 340 engaged with the main body 336 in the first portion 336*a* of the main body 336 and the second seal 342 engaged with the main body 336 in the second portion 336*b* of the main body 336, and the third and fourth seals 344, 346 cooperate to help seal the liquid flow path by being located on either side of the liquid outlet 326 with the third seal 344 engaged with the main body 336 in the second portion 336*b* of the main body 336 and the fourth seal 346 engaged with the main body 336 in the third portion 336*c* of the main body 336.

As the valve 322 moves from the first state toward the second state, the spool 334 and the first, second, third, and fourth seals 340, 342, 344, 346 extending therearound move in the first direction D1 relative to the main body 336. With the valve 322 in the second state, as shown in FIG. 3G, the first and second seals 340, 342 are no longer located on either side of the gas inlet 328 while the third and fourth seals 344, 346 are still located on either side of the liquid outlet 326 despite movement of the third and fourth seals 344, 346 in the first direction D1 along with the first and second seals 340, 342. Additionally, with the valve 322 in the second state, the second seal 342 has moved from being within the second portion 336*b* of the main body 336 to being within the first portion 336*a* of the main body 336 so as to no longer provide a scaling effect. The gas inlet 328 is therefore no longer obstructed by the spool 334 such that gas is free to flow into the gas inlet 328 from the mixing chamber 316, along the gas flow path in the valve 322, and out of the gas outlet 330 for venting out of the carbonation system 300.

FIG. 3C shows a gas outlet 348 of the mixing chamber 316 that is configured to be fluidly connected to the gas inlet 328 of the valve 322 (e.g., through tubing and/or other components). The gas outlet 348 is located at a top of the mixing chamber 316 since residual gas in the mixing chamber 316 will tend to be in a headspace of the mixing chamber 316.

With the valve 322 in the second state, the third seal 344 is engaged with the main body 336 in the main body's second portion 336*b* so as to provide a sealing effect and the fourth seal 346 is engaged with the main body 336 in the main body's third portion 336*c* so as to provide a sealing effect. Liquid thus cannot enter the valve 322 through the liquid inlet 324 to flow along the liquid flow path.

As the valve 322 moves from the second state toward the third state, the spool 334 and the first, second, third, and fourth seals 340, 342, 344, 346 extending therearound move in the first direction D1 relative to the main body 336. With the valve 322 in the third state, the lead screw's and spool's threads 332*t*. 334*t* are in a most threaded configuration, as shown in FIG. 3H. With the valve 322 in the third state, as shown in FIG. 3H, the first and second seals 340, 342 are not located on either side of the gas inlet 328 and the third and fourth seals 344, 346 are not located on either side of the liquid outlet 326. With the valve 322 in the third state, the gas inlet 328 is not obstructed by the spool 334 such that gas is free to flow into the gas inlet 328 from the mixing chamber 316, along the gas flow path in the valve 322, and out of the gas outlet 330 for venting out of the carbonation system 300. Additionally, with the valve 322 in the third state, the fourth seal 346 has moved from being within the third portion 336*c* of the main body 336 to being within the second portion 336*b* of the main body 336 so as to no longer provide a sealing effect. The liquid inlet 324 is therefore no longer obstructed by the spool 334 such that liquid is free to flow into the liquid inlet 324 from the mixing chamber 316, along the liquid flow path in the valve 322, and out of the liquid outlet 330 for dispensing from the carbonation system 300.

Figure 3K:
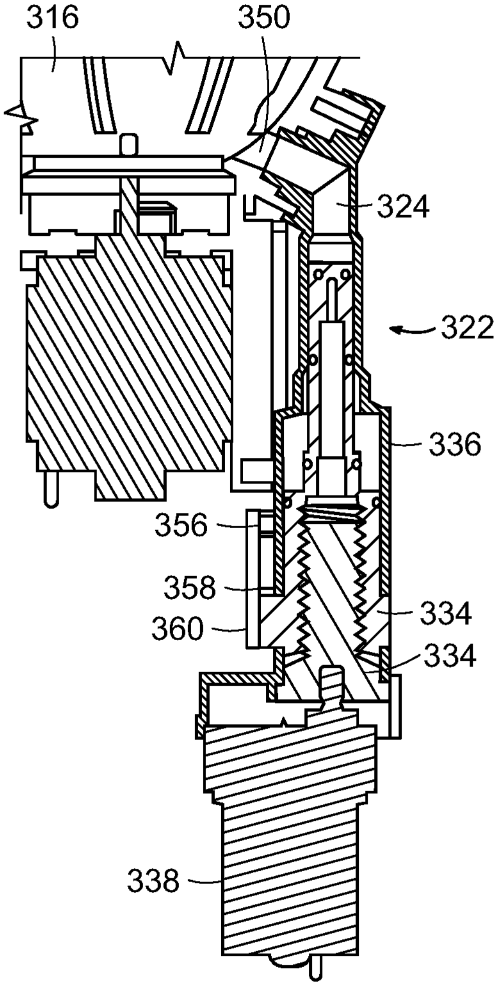
FIG. 3K is a cross-sectional side view of a portion of the carbonation system of FIG. 3A with a multi-purpose valve of the carbonation system in the third state.

The mixing chamber 316 includes a liquid outlet 350, as shown in FIG. 3K, that is configured to be fluidly connected to the liquid inlet 324 of the valve 322. The liquid outlet 350 is located at a bottom of the mixing chamber 316 since carbonated fluid in the mixing chamber 316 will tend to be urged downward in the mixing chamber 316 by gravity.

Figure 3L:
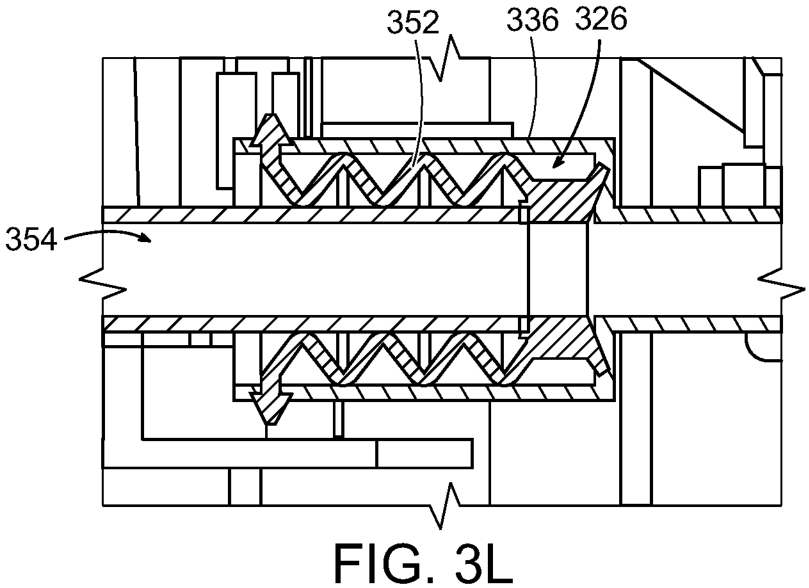
FIG. 3L is a cross-sectional side view of a portion of the carbonation system of FIG. 3A.
Figure 3M:
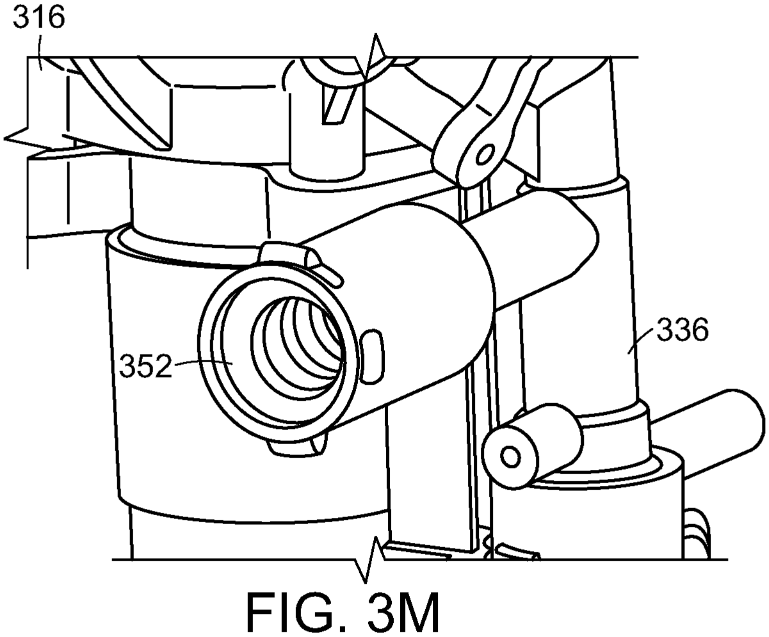
FIG. 3M is a perspective view of a portion of the carbonation system of FIG. 3A.

The valve 322 includes a fifth seal 352 located along the liquid flow path. As shown in FIGS. 3E, 3L, and 3M, the fifth seal 352 is disposed within the valve 322 at the liquid outlet 326. In an exemplary embodiment, the fifth seal 352 is flexible. The fifth seal 352 in this illustrated embodiment is a flexible bellows seal, such as a flexible bellows seal made of rubber, although other seals are possible.

As shown in FIG. 3L, an inlet 354 of a dispensing head of the carbonation system 300 is fluidly coupled to the liquid outlet 326 of the valve 322 into which carbonated fluid is configured flow from the mixing chamber 316. The inlet 354 is defined by a rigid tube. The liquid outlet 326 of the valve 322 is also defined by a rigid tube. As rigid members, the inlet 354 and the liquid outlet 326 may not precisely align, which could cause liquid, e.g., carbonated fluid, to leak into the carbonation system 300 from the liquid outlet 326 and/or the inlet 354. The fifth seal 352 is configured to account for any variation in alignment between the inlet 354 and the liquid outlet 326 and thereby prevent any liquid from leaking from the liquid outlet 326 and inlet 354. The fifth seal 352 is configured to account for any rotational misalignment and any translation misalignment between the liquid outlet 326 and the inlet 354. The rigid tube defining the inlet 354 is configured to extend into and be seated within the fifth seal 352, thereby allowing the flexible fifth seal 352 to seal around the rigid tube defining the inlet 354 to correct for any rotational misalignment and any translation misalignment with the valve's liquid outlet 326.

As mentioned above, the valve 322 is configured to move from the third state to the second state and from the second state to the first state. Such movement is opposite to that discussed above, with the spool 334 and the first, second, third, and fourth seals 340, 342, 344, 346 moving in a second direction D2 that is opposite to the first direction D1 as caused by the lead screw 332 rotating in an opposite direction than the direction that the lead screw 332 rotates in to cause the spool 334 and the first, second, third, and fourth seals 340, 342, 344, 346 to move in the first direction D1.

As mentioned above, the processor of the carbonation system 300 is configured to control the motor 338 and is thus configured control the movement of the lead screw 332 and the spool 334 as well as the availability of the gas and liquid flow paths. The carbonation system 300 includes first and second sensors 356, 358, shown in FIGS. 3K and 3N-3P, that configured to be operatively coupled with the processor to facilitate the processor's control of the motor 338. The carbonation system also includes third and fourth sensors (obscured in FIGS. 3K and 3N-3P) that are paired with the first and second sensors 356, 358 respectively. The first, second, third, and fourth sensors are optical sensor photointerrupters in this illustrated embodiment.

In this illustrated embodiment, a second PCB 360 includes the first and second sensors 356, 358. The second PCB 360 is configured to be operatively coupled with the processor to allow signals from the first and second sensors 356, 358 to be communicated to the processor. The second PCB 360 is protected with a casing 362, as shown in FIG. 3D.

Figure 3N:
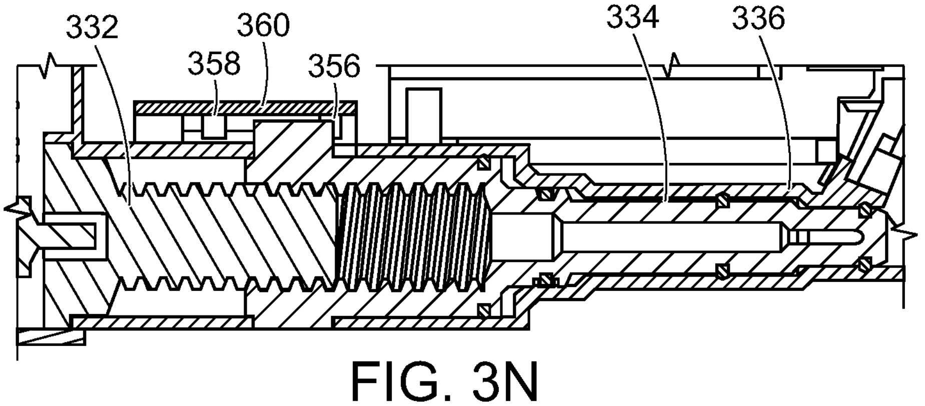
FIG. 3N is a cross-sectional side view of a portion of the carbonation system of FIG. 3A with the multi-purpose valve of the carbonation system in the first state.

With the valve 322 in the first state, as shown in FIG. 3N, the first sensor 356 is blocked from its associated third sensor by the spool 334 and the second sensor 358 is not blocked from its associated fourth sensor by the spool 334. The processor is thus configured to receive a signal from the second sensor 358 but not from the first sensor 356, thereby indicating to the processor that the valve 322 is in the first state.

Figure 3O:
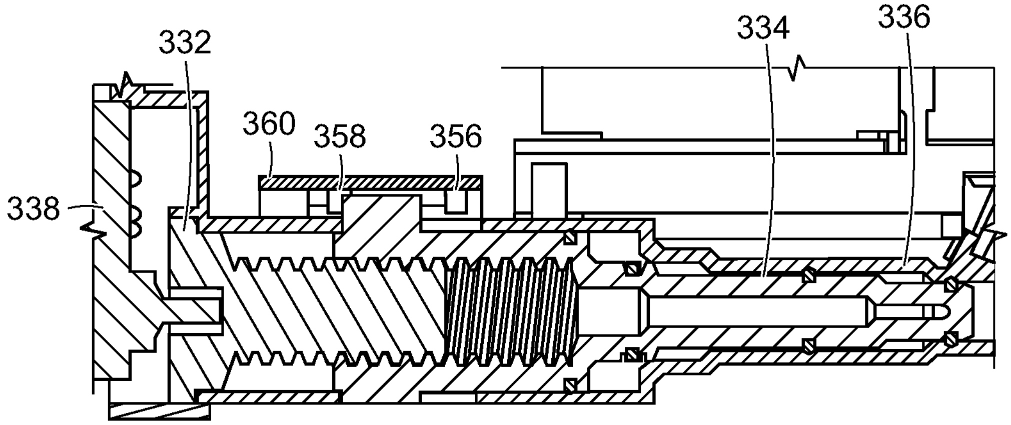
FIG. 3O is a cross-sectional side view of the portion of the carbonation system of FIG. 3N with the multi-purpose valve of the carbonation system in the second state.

With the valve 322 in the second state, as shown in FIG. 3O, the first sensor 356 is not from its associated third sensor blocked by the spool 334 and the second sensor 358 is blocked from its associated fourth sensor by the spool 334. The processor is thus configured to receive a signal from the first sensor 356 but not from the second sensor 358, thereby indicating to the processor that the valve 322 is in the second state.

Figure 3P:
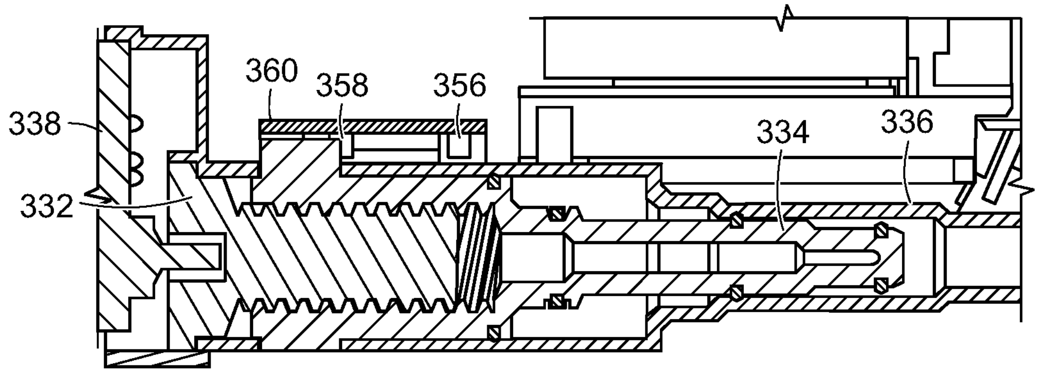
FIG. 3P is a cross-sectional side view of the portion of the carbonation system of FIG. 3N with the multi-purpose valve of the carbonation system in the third state.

With the valve 322 in the second state, as shown in FIG. 3P, each of the first and second sensors 356, 358 is not blocked from their associated third and fourth sensors, respectively, by the spool 334. The processor is thus configured to receive a signal from each of the first and second sensors 356, 358, thereby indicating to the processor that the valve 322 is in the third state.

The processor is configured to control the motor 338 based on the signals variously received from the first and second sensors 356, 358. In response to the processor receiving a signal from the first sensor 356 but not from the second sensor 358, the processor is made aware that the valve 322 has moved from the first state (or from the third state) to the second state and that the motor 338 can thus stop being driven if the second state is the desired state. In response to the processor receiving a signal from the second sensor 358 but not from the first sensor 356, the processor is made aware that the valve 322 has moved from the second state to the first state and that the motor 338 can thus stop being driven if the first state is the desired state. In response to the processor receiving a signal from each of the first and second sensors 356, 358, the processor is made aware that the valve 322 has moved from the second state to the third state and that the motor 338 can thus stop being driven if the third state is the desired state.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A beverage system comprising:

a mixing chamber in which a carbonated fluid is formed by mixing a liquid and carbon dioxide; and a valve configured to receive the carbonated fluid from the mixing chamber and to receive residual carbon dioxide from the mixing chamber, wherein the valve includes main body with a lead screw and a spool disposed therein, wherein the spool is threadedly engaged with the lead screw, the valve having:

a first state in which the carbonated fluid cannot flow through the valve and the residual carbon dioxide cannot flow through the valve, a second state in which the carbonated fluid cannot flow through the valve and the residual carbon dioxide can flow through the valve, and a third state in which the carbonated fluid can flow through the valve and the residual carbon dioxide can flow through the valve.

2. The beverage system of claim 1, wherein the valve is configured to move from the first state to the second state, from the second state to a selected one of the first and third states, and from the third state to the second state.

3. The beverage system of claim 1, further comprising a processor configured to control the movement of the valve from the first state to the second state, from the second state to the selected one of the first and third states, and from the third state to the second state.

4. The beverage system of claim 1, wherein, with the valve in the third state, the carbonated fluid is configured to flow through the valve and be dispensed into a beverage container from a carbonation system that includes the valve and the mixing chamber; and with the valve in either the second state or the third state, the residual carbon dioxide is configured to flow through the valve and be vented from a carbonation system that includes the valve and the mixing chamber.

5. The beverage system of claim 1, wherein the valve defines a first flow path therethrough along which the carbonated fluid is configured to pass through the valve with the valve in the third state;

the valve defines a second flow path therethrough along which the residual carbon dioxide is configured to pass through the valve with the valve in either the second state or the third state; and the first and second flow paths do not cross or overlap.

6. The beverage system of claim 1, wherein the lead screw is configured to rotate relative to the main body, thereby causing the spool to move linearly relative to the main body and move the valve from the first state to the second state, from the second state to a selected one of the first and third states, or from the third state to the second state.

7. The beverage system of claim 1, further comprising a motor configured to drive the rotation of the lead screw.

8. The beverage system of claim 6, further comprising a processor configured to control the motor.

9. The beverage system of claim 7, further comprising a plurality of sensors operatively coupled with the processor;

wherein the processor is configured to control the motor based on whether or not a signal is received from each of the plurality of sensors.

10. The beverage system of claim 1, further comprising a plurality of seals disposed in the main body and extending circumferentially around the spool.

11. The beverage system of claim 1, wherein an interior of the main body defines a stepped shape of varying diameters; and an exterior of the spool defines a stepped shape of varying diameters corresponding to the stepped shape of the main body.

12. The beverage system of claim 1, wherein the main body defines a first inlet for the carbonated fluid, a first outlet for the carbonated fluid, a second inlet for the residual carbon dioxide, and a second outlet for the carbon dioxide.

13. The beverage system of claim 11, further comprising a flexible seal disposed in the first outlet.

14. The beverage system of claim 11, wherein:

with the valve in the first state, the spool is configured to prevent the carbonated fluid from entering the first inlet and passing through the valve to the first outlet and is configured to prevent the residual carbon dioxide from entering the second inlet and passing through the valve to the second outlet, with the valve in the first state, the spool is configured to prevent the carbonated fluid from entering the first inlet and passing through the valve to the first outlet and is configured to allow the residual carbon dioxide to enter the second inlet and pass through the valve to the second outlet, and with the valve in the first state, the spool is configured to allow the carbonated fluid to enter the first inlet and pass through the valve to the first outlet and is configured to allow the residual carbon dioxide to enter the second inlet and pass through the valve to the second outlet.

15. The beverage system of claim 1, wherein the mixing chamber is configured to receive the liquid from a liquid source in fluid communication with the mixing chamber and to receive the carbon dioxide from a gas source in fluid communication with the mixing chamber.

16. A method for a beverage system, comprising:

causing the valve of the beverage system of claim 1 to move from the first state to the second state and from the second state to the third state.

17. The method of claim 15, wherein a processor of the beverage system of claim 1 controls a motor of the beverage system of claim 1 to cause the valve to move from the first state to the second state and from the second state to the third state.

18. A method for a beverage system, comprising:

forming a carbonated fluid in a mixing chamber of a carbonation system; and after the formation of the carbonated fluid, changing a state of a valve of the carbonation system such that residual carbon dioxide in the mixing chamber is allowed to enter and pass through the valve for venting out of the carbonation system, and thereafter changing the state of the valve again such that carbonated fluid in the mixing chamber is allowed to enter and pass through the valve for dispensing out of the carbonation system into a beverage container, wherein the valve includes main body with a lead screw and a spool disposed therein, wherein the spool is threadedly engaged with the lead screw.

19. The method of claim 17, wherein a processor of the carbonation system controls the formation of the carbonation fluid and controls the changing of the state of the valve.

* * * * *